US010613276B2

United States Patent
Mansouri Rad et al.

(10) Patent No.: US 10,613,276 B2
(45) Date of Patent: Apr. 7, 2020

(54) OPTICAL SCANNER WITH OPTICALLY SWITCHED PATHS TO MULTIPLE SURFACE OR EDGE COUPLERS

(71) Applicants: Mohammad Mehdi Mansouri Rad, Kanata (CA); Patrick Dumais, Ottawa (CA); Dominic John Goodwill, Ottawa (CA); Eric Bernier, Kanata (CA)

(72) Inventors: Mohammad Mehdi Mansouri Rad, Kanata (CA); Patrick Dumais, Ottawa (CA); Dominic John Goodwill, Ottawa (CA); Eric Bernier, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 16/003,602

(22) Filed: Jun. 8, 2018

(65) Prior Publication Data

US 2019/0377135 A1 Dec. 12, 2019

(51) Int. Cl.
| | |
|---|---|
| *G02B 6/35* | (2006.01) |
| *G02B 6/34* | (2006.01) |
| *G02B 6/32* | (2006.01) |
| *G01S 17/06* | (2006.01) |
| *G01S 7/481* | (2006.01) |

(52) U.S. Cl.
CPC .......... *G02B 6/354* (2013.01); *G01S 7/4811* (2013.01); *G01S 7/4814* (2013.01); *G01S 17/06* (2013.01); *G02B 6/32* (2013.01); *G02B 6/34* (2013.01)

(58) Field of Classification Search
CPC .. G02B 6/354; G02B 6/32; G02B 6/34; G01S 7/4811; G01S 17/06; G01S 7/4814
See application file for complete search history.

(56) References Cited

U.S. PATENT DOCUMENTS

| | | | |
|---|---|---|---|
| 2005/0018264 A1* | 1/2005 | Benedict | G02B 26/10 |
| | | | 359/196.1 |
| 2013/0162974 A1 | 6/2013 | Dakin et al. | |
| 2017/0010414 A1* | 1/2017 | Dumais | G02B 6/124 |
| 2017/0299697 A1* | 10/2017 | Swanson | G01N 21/17 |
| 2017/0371227 A1* | 12/2017 | Skirlo | G02F 1/2955 |

FOREIGN PATENT DOCUMENTS

WO 2011068712 A2 6/2011

\* cited by examiner

*Primary Examiner* — John Bedtelyon

(57) ABSTRACT

A LIDAR or other optical beamsteering apparatus includes an optical switch having a first port and a plurality of second ports. The switch is operated to establish an optical path between the first port and one of the second ports. The first port is connected to a light source or a light detector. Different second ports are connected to different surface/edge couplers. Each of the surface/edge couplers couples light from or to the apparatus in a different respective direction. The surface/edge couplers can be grating couplers. The direction of light coupling is configured due to the orientation of the surface/edge coupler and its grating period, where applicable. Surface/edge couplers can be arranged in a circular or concentric ring pattern. Grating couplers can be elongated.

27 Claims, 24 Drawing Sheets

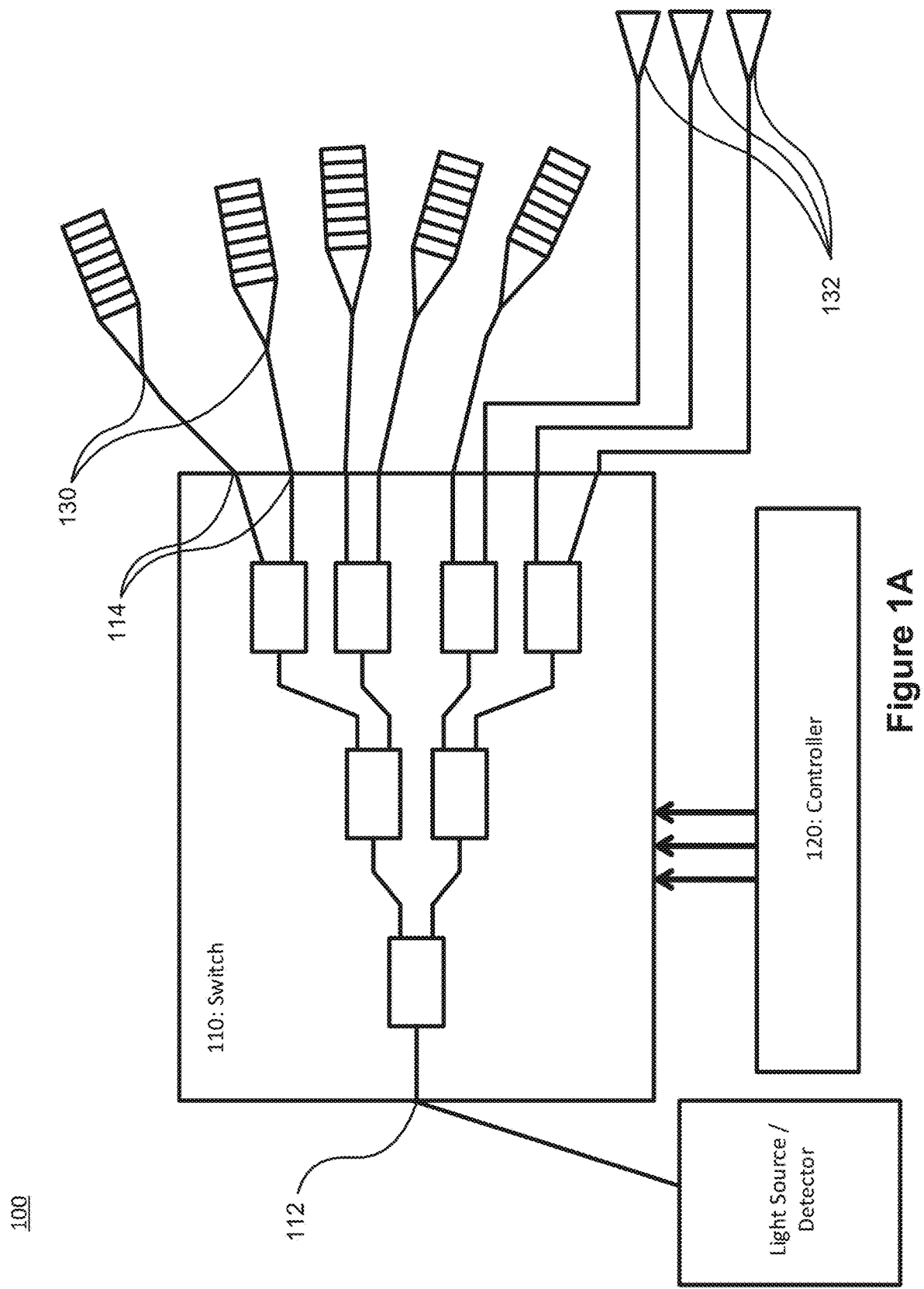

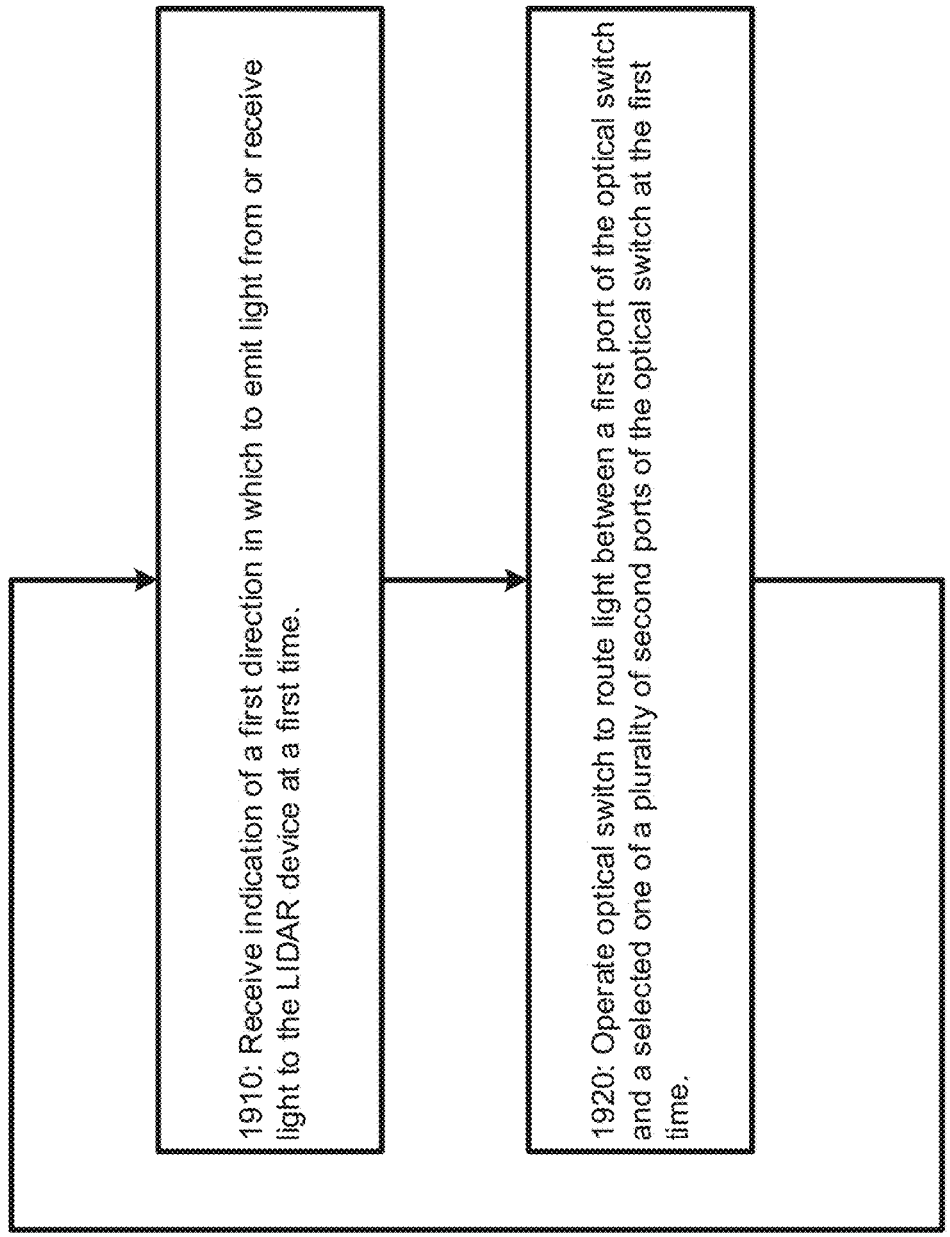

OPTICAL SCANNER WITH OPTICALLY SWITCHED PATHS TO MULTIPLE SURFACE OR EDGE COUPLERS

FIELD OF THE INVENTION

The present invention pertains to the field of optical beam-steering devices and in particular to a LIDAR apparatus employing optical switching.

BACKGROUND

Low cost, high resolution optical beam-steering has potential applications such as use in Light Detection and Ranging (LIDAR), self-driving vehicles, pattern recognition, face-scanning, surveying, object scanning in manufacturing, object recognition in manufacturing, and optical communication switching equipment. LIDAR devices with few to no moving parts can be advantageous due to their operational reliability. In many applications, LIDAR is required to scan a wide target region, by directing different light beams in different directions, and detecting reflections from objects in corresponding different parts of the target region. This scanning may be termed optical scanning or optical beam-steering. Controllably directing one or multiple beams in these different directions adds to cost and complexity of the LIDAR. High-resolution LIDAR requires a larger number of beam directions per unit field of view.

Optical switches are used extensively in optical networks to controllably route received optical communication signals at switch input ports to desired output ports. The switch is set, for example via electronic control signals, so that an optical path is established from a selected input port to a selected output port. Some versions of these switches utilize a network of 1×2 or 2×2 switching cells, each of which operates based on Mach-Zehnder interferometers.

U.S. Patent Application Publication No. 2017/0371227 discloses an optical beamsteering device for LIDAR that uses a switch matrix to route input light to a single output coupler, such as a grating or photonic crystal. An aplanatic lens is interposed between the switch matrix and the output coupler. However, the incorporation of a lens and the use of a single output coupler may present design or an operational drawback in some applications and in particular limits the scalability and resolutions of such technique in high resolution applications.

Therefore there is a need for a LIDAR scanner and corresponding method that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an optical beamsteering (e.g. LIDAR) method and apparatus. For optical beam emission, an optical switching fabric controllably routes input light to a selected one or more of a plurality of optical couplers. The couplers can be, for example, grating couplers disposed on the surface of an integrated photonics device, or edge couplers disposed along an edge of the integrated photonics device. These couplers are directly or indirectly (e.g. via lenses, planar mirrors, curved mirrors) exposed to the spatial region around the apparatus, so that the apparatus can emit light via the couplers. Input light can be routed, via the optical switching fabric, to different couplers at different times, for example to implement LIDAR scanning. Each coupler can be configured to emit light in a different direction. The configuration can be achieved by spatial orientation of the coupler, configuration of a grating period in the case of a grating coupler, addition of a beam deflector (e.g. a static prism) to each coupler, or a combination thereof. The beam from a coupler may be divided into a plurality of beams by means of a light splitting element (e.g. a static diffractive optical element). Said beam deflectors and light splitting elements may be disposed at the optical output of the couplers, or may be at a secondary imaging plane to which light from the couplers is directed by an optical imaging system (e.g. via lenses, planar mirrors, curved mirrors).

Optical beam (e.g. LIDAR) reception can be implemented in a complementary manner, with light (e.g. reflected LIDAR light) received at one of a plurality of couplers being directed into the optical switching fabric. The switching network can be operated to monitor light incident at different couplers at different times. Although apparatus operation is primarily described herein with respect to light emission, it should be readily understood that the same apparatus and principles can be employed for light reception, by reversing the light propagation direction. It should also be noted that a different LIDAR receiver can also be used in cooperation with the LIDAR transmitter as described herein.

In accordance with an embodiment of the present invention, there is provided an optical beamsteering (e.g. LIDAR) apparatus comprising an optical switch fabric and a plurality of surface/edge couplers. The optical switch fabric includes a first port and a plurality of second ports and is configured to controllably establish an optical path between the first port and a selected one of the plurality of second ports. Each of the plurality of surface/edge couplers is optically coupled to a different respective one of the plurality of second ports. Each of the plurality of surface/edge couplers is configured to couple light from or to the apparatus in a different respective direction. The surface/edge couplers can include surface grating couplers. Coupling light in different directions can be achieved by different orientations of different surface/edge couplers, different grating periods (in the case of surface grating couplers), or a combination thereof.

In accordance with another embodiment of the present invention, there is provided a method for operating an optical beamsteering (e.g. LIDAR) device, the method includes receiving an indication of a first direction in which to emit light from or receive light to the device at a first time. The method includes operating an optical switch to route light between a first port of the optical switch and a selected one of a plurality of second ports of the optical switch at the first time. The first port is coupled to a light source or a light detector. Each of the plurality of second ports is coupled to a different respective one of a plurality of surface/edge couplers. Each of the plurality of surface/edge couplers is configured to couple light from or to the apparatus in a different respective direction. The selected one of a plurality of second ports is coupled to a respective one of the plurality of surface/edge couplers which is configured to couple light in the first direction.

Although the present invention is described primarily with respect to a LIDAR method and apparatus, it should be understood that the present invention is not necessarily limited to LIDAR. More generally, therefore, the present invention relates to an optical beamsteering apparatus and associated, which allows source light to be steered as output beams in desired directions using a combination of an optical switching fabric and a plurality of surface/edge couplers. The optical beamsteering apparatus can also operate for beam reception.

BRIEF DESCRIPTION OF THE FIGURES

Further features and advantages of the present invention will become apparent from the following detailed description, taken in combination with the appended drawings, in which:

FIG. 1A illustrates a LIDAR apparatus including an optical switch and a plurality of surface/edge couplers, in accordance with an embodiment of the present invention.

FIG. 19 illustrates a method for operating a LIDAR device according to an embodiment of the present invention.

It will be noted that throughout the appended drawings, like features are identified by like reference numerals.

DETAILED DESCRIPTION

Figure 1B:
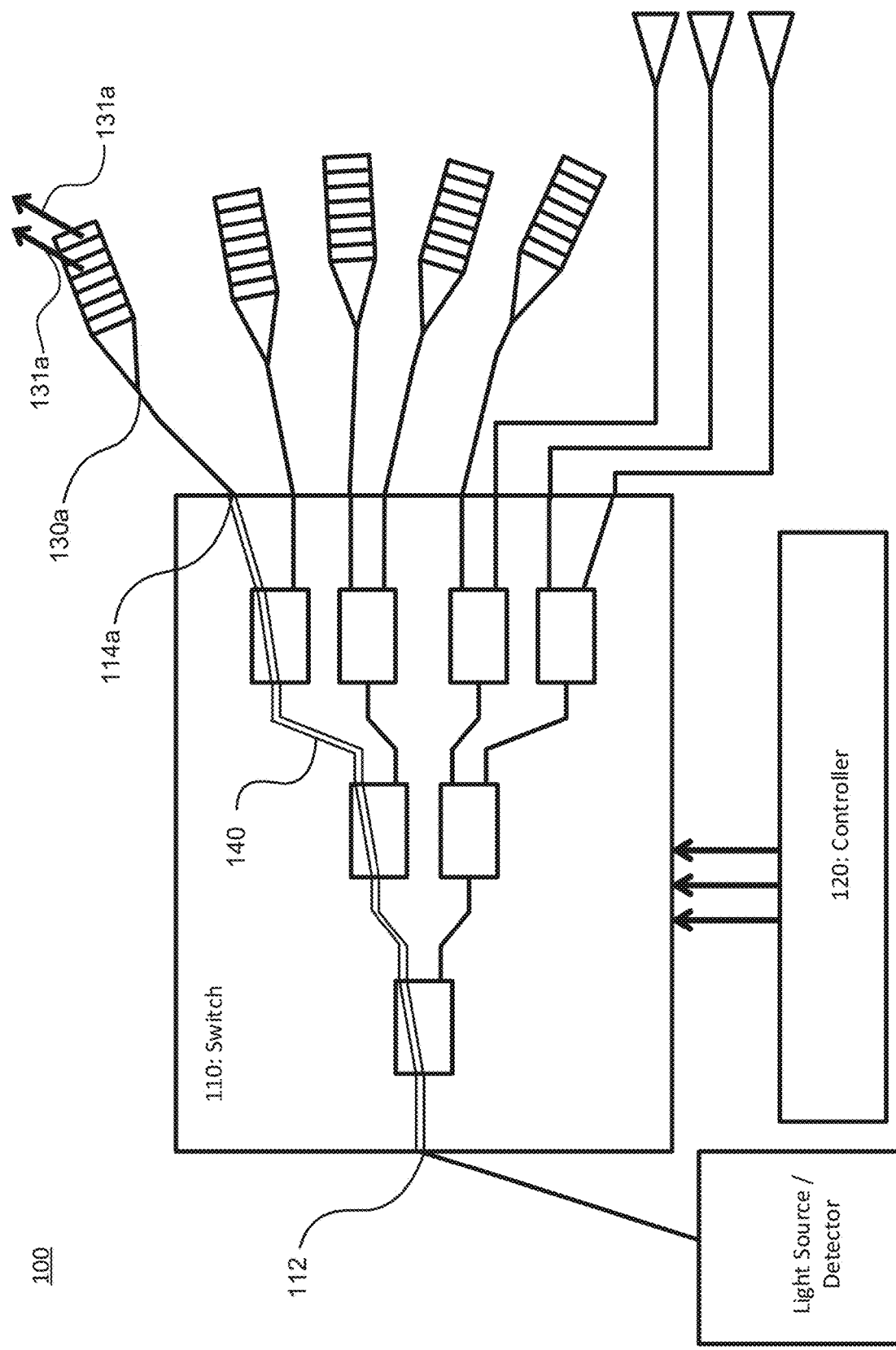
FIG. 1B illustrates example operation of the LIDAR apparatus of FIG. 1A.

Embodiments of the present invention provide for an optical beamsteering (e.g. LIDAR) apparatus which uses an optical switch to route light (e.g. LIDAR light) to different directional emitters, from different directional receivers, or both. The directional emitters or receivers can be surface/edge couplers configured to primarily emit toward or receive light from a particular angular direction. Having regard to FIG. 1A, an apparatus 100 provided according to an embodiment of the present invention includes an optical switch fabric 110 (also referred to as an optical switch) having a first port 112 and a plurality of second ports 114. The optical switch fabric 110 is configured to controllably establish an optical path between the first port 112 and a selected one (or more) of the plurality of second ports 114 at a time. A controller 120 can be used to generate and provide control signals for operating the optical switch fabric 110. The apparatus further includes a plurality of surface/edge couplers 130, 132 each optically coupled to a different respective one of the plurality of second ports 114. Each of the plurality of surface/edge couplers 130, 132 is configured to couple light from the LIDAR apparatus into the surrounding medium, or from the surrounding medium to the LIDAR apparatus. By way of example, couplers 130 are shown as surface couplers having grating structures, while couplers 132 are edge couplers. However, the apparatus may optionally employ only surface couplers, only edge couplers, or a combination of surface couplers and edge couplers. Furthermore, different surface/edge couplers 130, 132 can couple light from or to the LIDAR apparatus in different respective three-dimensional directions relative to the LIDAR apparatus. For example, a first surface coupler disposed on a planar surface of the LIDAR apparatus can emit light at a first angle relative to the planar surface, while a second surface coupler disposed on the planar surface can emit light at a second, different angle relative to the planar surface. The apparatus 100 can be integrated with one or a plurality of other components, for example in a photonic integrated circuit device or other planar laminated structure comprising the apparatus 100 and optionally additional optical components, electronic components, or both.

FIG. 1B illustrates operation of the apparatus of FIG. 1A, where the optical switch fabric 110 has been operated by the controller 120 to establish an optical path 140 between the first port 112 and a particular second port 114*a*. The second port 114*a* is coupled to a particular surface/edge coupler 130*a*. Light 131*a* is shown emitting the surface/edge coupler 130*a* at an angle particular to the construction of the surface/edge coupler 130*a*. Alternatively, light can be received by the surface/edge coupler 130*a* and routed along the optical path 140. The surface/edge coupler 130*a* will be primarily sensitive to incident light propagating in the opposite direction to light 131*a*.

Figure 1C:
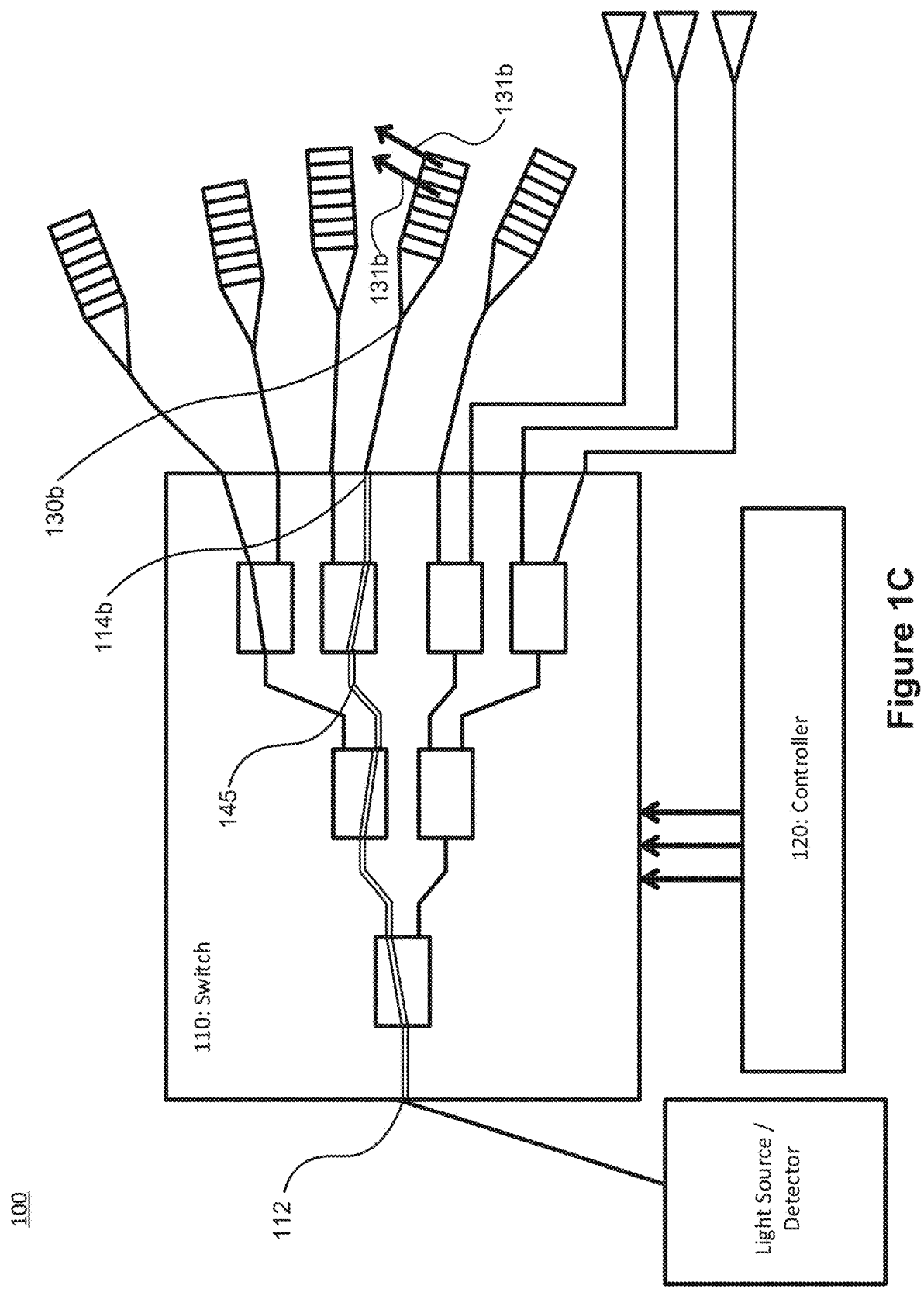
FIG. 1C illustrates another example operation of the LIDAR apparatus of FIG. 1A.

FIG. 1C illustrates the apparatus of FIG. 1A, where the optical switch fabric 110 has been operated by the controller 120 to establish an optical path 145 between the first port 112 and a different particular second port 114*b* at a different time. The second port 114*b* is coupled to a particular surface/edge coupler 130*b*. Light 131*b* is shown emitting the surface/edge coupler 130*b* at an angle particular to the construction of the surface/edge coupler 130*b*. Alternatively, light can be received by the surface/edge coupler 130*b* and routed along the optical path 145.

Optical Switch

Embodiments of the present invention employ an optical switch for controlling LIDAR light directionality. The optical switch can be based on switching technology similar to that used in datacenters, for example. Such an optical switch is capable of establishing a light path between a first port and a controllably selectable second port. The second port is selected using a control signal. By changing the light path over time by control of the switch, a discrete scanning action of the LIDAR apparatus can be implemented.

In various embodiments, the optical switch fabric comprises a tree structure having one first port and N>1 second ports. Light paths between the first port and a selected one (or more) of the second ports can be controllably established. The switch may include $\log_2(N)$ cascading stages of 1×2 switching cells connecting the first port to the second ports. Each 1×2 switching cell is responsive to control signals to optically connect an input/output port on one side of the cell with one of two output/input ports on the other side of the cell. Stage 1 includes one switching cell. Stage n>1 includes $2^{n-1}$ switching cells, each having its input/output port connected to a different output/input port of a switching cell in the previous stage. In some embodiments, the optical switch fabric may include about 10 stages, although more or fewer stages are also possible.

Figure 2A:
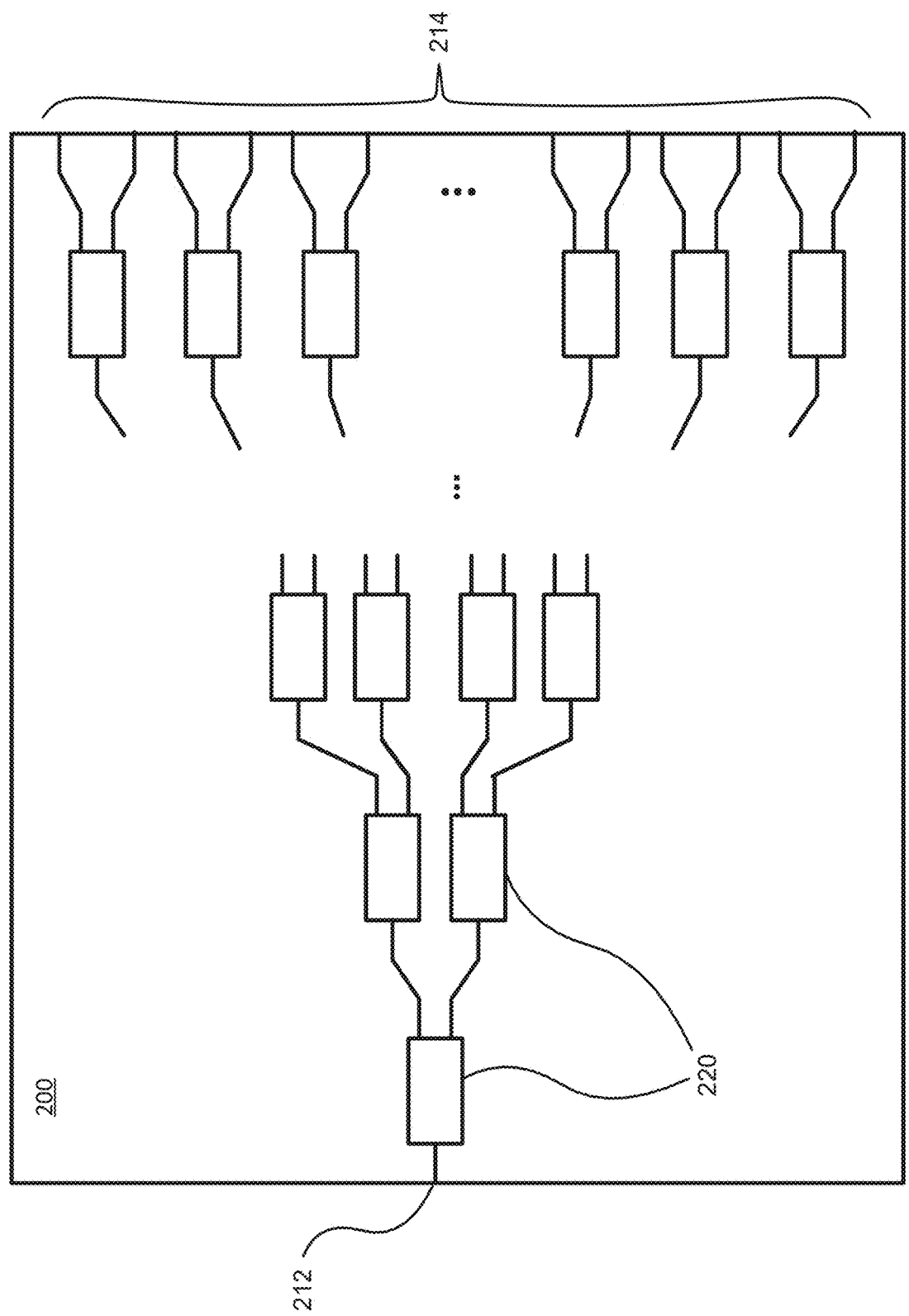
FIG. 2A illustrates a 1×N optical switch for a LIDAR apparatus, in accordance with an embodiment of the present invention.

FIG. 2A schematically illustrates part of an optical switch fabric 200, according to an embodiment of the present invention. The optical switch fabric includes a first port 212, a plurality of second ports 214, and a plurality of 1×2 switching cells 220 in a cascading tree structure. The 1×2 switching cells are optically coupled together and responsive to control signals to establish a light path between the first port 212 and a selected one or more of the second ports 214. Some stages of the tree structure, some parts of the final stage of the tree structure, and some of the second ports 214, are not shown in FIG. 2A. The switching cells 220 are coupled to each other and to the ports 212, 214, via optical waveguides which may be straight or which may include one or more bends or curves therein.

In other embodiments, the optical switch fabric comprises M>1 first ports and N>1 second ports. Light paths between a selected one or more of the first ports and a selected one or more of the second ports can be controllably established. This allows LIDAR light to be concurrently output from multiple light sources or input to multiple light detectors. Examples of M×N optical switches, for example formed from a plurality of optically coupled and controllable 2×2 switching cells, will be readily understood by a worker skilled in the art.

Figure 2B:
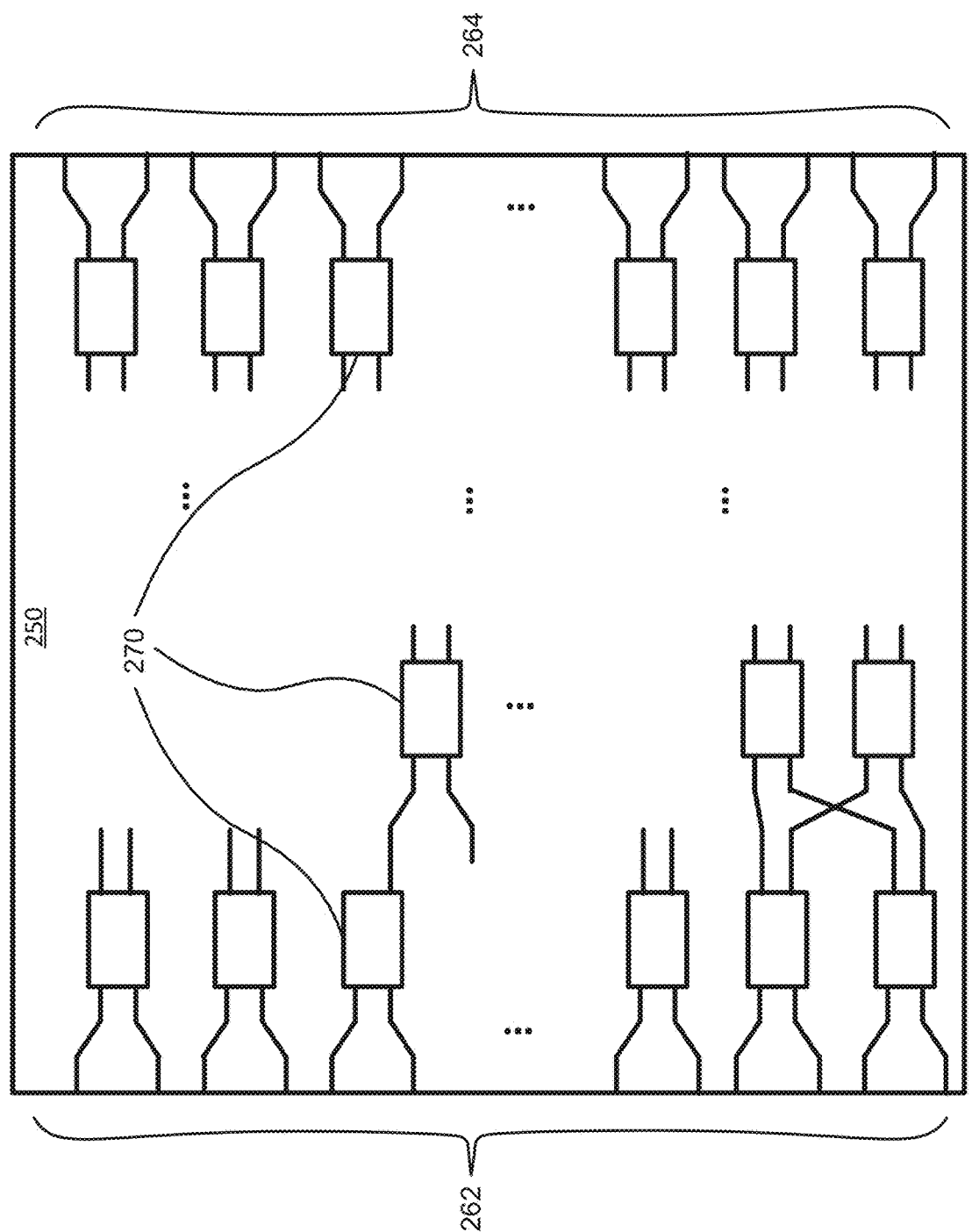
FIG. 2B illustrates an M×N optical switch for a LIDAR apparatus, in accordance with another embodiment of the present invention.

FIG. 2B illustrates part of an optical switch fabric 250, according to an embodiment of the present invention. The optical switch fabric includes a plurality of first ports 262, a plurality of second ports 264, and a plurality of 2×2 switching cells 270 for controllably operatively coupling selected ones of the first ports to selected ones of the second ports. The 2×2 switching cells are optically coupled together and responsive to control signals to establish light paths between first ports 262 and second ports 264. Some parts of the switch 250 are not shown in FIG. 2B. The switching cells 270 are coupled to each other and to the ports 262, 264, via waveguides which may be straight or which may include one or more bends or curves therein. One, two, or more of the first ports 262 can be coupled to other components such as light sources and light detectors. Unused ports may be terminated.

In one embodiment, a first one of a plurality of first ports can be coupled to a light source and a second one of the plurality of first ports can be coupled to a light detector. When emitting light by the LIDAR, a light path can be created between the first one of the first ports and a selected one of the second ports. When receiving light by the LIDAR, a return light path can be created between a selected one of the second ports and the second one of the first ports.

In various embodiments comprising a switching fabric with a plurality of first ports as in FIG. 2B, the optical switch fabric may be configured to controllably establish an optical path between a selected one of the first ports and a selected one of the plurality of second ports. Such an embodiment may be useful, for instance, when there is more than one optical source, providing redundancy if an optical source fails. As such, at least two of the plurality of first ports can be coupled to different respective redundant optical sources. The optical switch fabric of this embodiment may alternatively be configured to controllably establish a plurality of optical paths, each between a selected one of the first ports and a selected one of the plurality of second ports, either sequentially or essentially at the same time (concurrently). This may be used to generate multiple output beams, which may speed up the LIDAR imaging system, possibly at the expense of more complex apparatus and signal processing. Concurrently establishing plural optical paths through a switch can be performed to an extent which may depend on the switching fabric architecture, as will be readily understood by a worker skilled in the art.

In view of the above, it should be understood that the first port of the optical switch fabric, which is selected as a first endpoint of an established optical path, may be a selected one of a plurality of first ports. Each of the plurality of first ports is optically connectable via the optical switch fabric to at least one of the plurality of second ports. Furthermore, the optical switch fabric may be configured to controllably establish, either concurrently or at a different time, a second optical path between a second selected one of the plurality of first ports (typically different from the first port) and a second selected one of the plurality of second ports (typically different from the second port).

Although the first and second ports are illustrated in FIGS. 2A and 2B as all being aligned in a common direction, in various embodiments the different ports can be oriented in different directions. Orientation of a port corresponds to the orientation of a waveguide at the location of the port.

The components of the switch can be physically arranged in a radial manner in some embodiments. The first port may be located at or coupled to a center of the physical arrangement and the second ports may be located outward from the center and oriented in different directions within the planar region comprising the switch. This allows different second ports to be more easily provided at different physical angles within the plane. By physically arranging the components of the switch in a radial manner within a planar structure, the output ports can be aligned with (or more closely with) the desired planar orientation of the surface/edge couplers to which they connect. This mitigates the need for long intermediate waveguides with gradual bends and can allow for a reduction in size of the apparatus.

Figure 3:
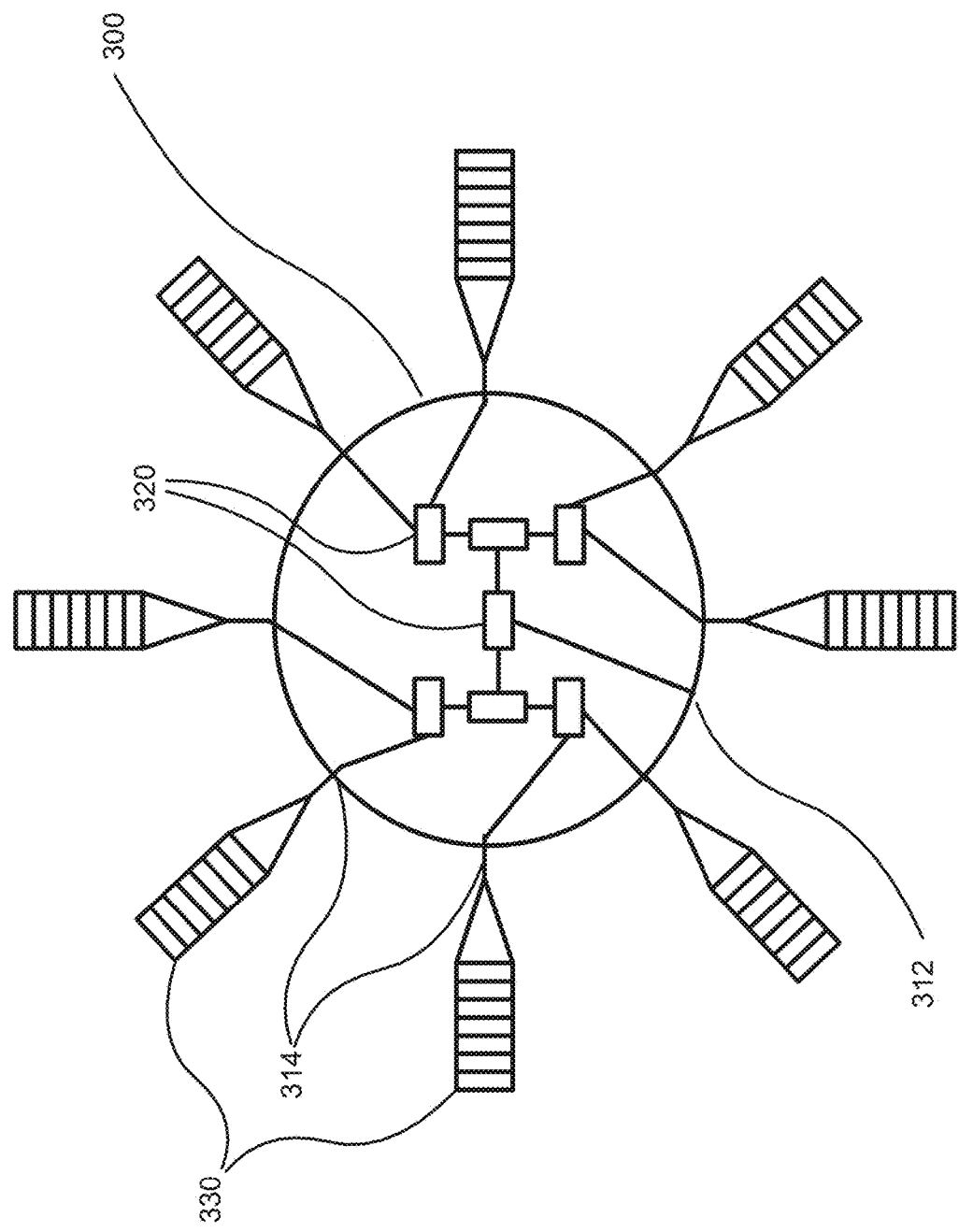
FIG. 3 illustrates an optical switch having a radial structure and coupled to a plurality of surface/edge couplers, in accordance with an embodiment of the present invention.

FIG. 3 illustrates an optical switch fabric 300 having a radial structure. Specifically, different second ports 314 are oriented at different angles and are located substantially at different points around the perimeter (circumference) of a circle. In other embodiments, the second ports can be located around the perimeter of a different regular or irregular shape, such as a polygon or ellipse. Surface couplers 330 are illustrated as being coupled to the second ports and also oriented at different angles. Edge couplers may additionally or alternatively be coupled to one or more of the second ports. The optical switch fabric 300 and the surface couplers 330 may be part of a substantially planar apparatus. The first port 312 is also shown. The optical switch fabric 300 includes a plurality of (e.g. 1×2) switching cells 320 coupled to each other and to the ports 312, 314 via waveguides. In order to implement the radial structure, the switching cells 320, waveguides, or both, can be oriented at different angles within the plane of the optical switch fabric 300. Only eight second ports are shown for clarity, however the optical switch fabric may have a larger number of ports in practice.

The optical switch fabric can include plural 1×2 or 2×2 switching cells connected together and individually controlled. Example switching cell may be a Mach-Zehnder Interferometer (MZI) switching cell, or another type of switching cell for example based on Micro electromechanical systems (MEMS), Micro-Ring Resonator structures, etc. A 1×2 switching cell can be constructed from a 2×2 switching cell with one input port being terminated.

Figure 4:
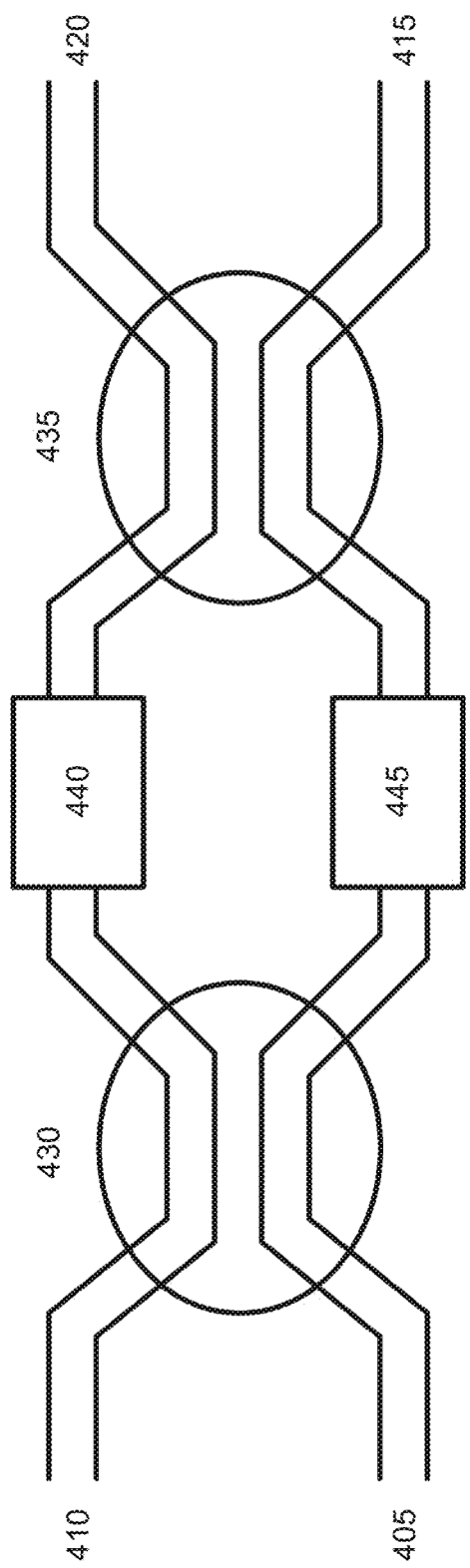
FIG. 4 illustrates a Mach-Zehnder Interferometer (MZI) switching cell according to the prior art.

By way of example, FIG. 4 illustrates a prior art MZI switching cell having first and second (optical) inputs 405, 410 and first and second (optical) outputs 415, 420 To form a 1×2 switching cell, the second input 410 can be terminated. The MZI switching cell further includes a pair of 2×2 optical couplers 430, 435 and a pair of controllable optical phase shifters 440, 445. By controlling the phases imparted by the phase shifters, light present at the first input 405 can be controllably steered to one of the first output 415 and the second output 420, and, if required, light present at the second input 410 can be controllably steered to the other of the first output 415 and the second output 420.

Surface/Edge Couplers

Each second port of the optical switch fabric is coupled directly or via a section of waveguide to a surface/edge coupler. A surface/edge coupler can be integrated into a waveguide that nominally establishes a port and is coupled directly to an optical switching cell of the switch fabric. Different ports are typically coupled to different surface/edge couplers. For LIDAR emission, the surface/edge coupler receives light from the switch and emits the light into the surrounding environment. The surface/edge coupler may be a passive device which redirects light provided thereto. Each surface/edge coupler is configured to couple (e.g. emit) light primarily in a particular direction in three-dimensional space. Different surface/edge coupler can be configured to couple (e.g. emit) light in different directions. This configuration can be achieved by physical orientation of a surface/edge coupler, configuration of the surface/edge coupler (e.g. of its grating structure), or a combination thereof.

Surface/edge couplers are also known from other applications for example for coupling light to or from an optical fiber or other external waveguide. However, in the case of the present invention, the surface/edge couplers are employed to (e.g. directly) couple light between the apparatus and the surrounding medium (e.g. air).

The surface/edge couplers may be grating couplers exposed at a (e.g. planar) surface of a photonic integrated circuit of the LIDAR apparatus. When the waveguides of the device are disposed in a planar region having an upper surface and a lower surface, the upper surface is exposed and a grating structure is etched into the upper surface. In various embodiments, the surface couplers include a silicon waveguide and a patterned silicon nitride overlay. The overlay is patterned or etched with a grating structure having a desired grating period.

By configuring the periodic spacing between peaks of the grating structure, the primary direction in which light of a given frequency is coupled into or out of the grating coupler can be configured accordingly. This configuration is typically performed at the time of fabrication or at another time prior to LIDAR operation.

Embodiments of the present invention comprise adapting the grating structure of each surface coupler, so that this surface coupler emits light primarily at a desired emission angle with respect to a longitudinal axis of the surface coupler. The surface coupler is viewed as a leaky waveguide disposed adjacent to the surface of a substrate and oriented in the direction of this longitudinal axis, which is parallel to the primary general direction of light propagation through the waveguide. The grating structure can be adapted with respect to its grating period, for example based on the effective refractive index of the waveguide, or other relevant characteristics. The following grating equation is applicable in various embodiments of the present invention:

$$\sin\theta = \overline{n_{eff}} - m\frac{\lambda}{\Lambda} \quad (1)$$

Equation (1) is explained in more detail for example in "Physics of photonic devices," Second edition, by Sun Lien Chuang, Section 8.1.3, Wiley 2009. In Equation (1), θ is the emission angle of light in the axial direction, $\overline{n_{eff}}$ is the average effective refractive index for the surface coupler, m is the grating order, λ is the operating wavelength of the LIDAR, and Λ is the grating period for the surface coupler. In various embodiments, m may be assumed equal to 1. Given the values for the other parameters, Λ can be set to achieve the desired emission angle θ. Λ can be configured differently for different surface couplers having different desired emission angles. Although the above discussion is given in terms of LIDAR emission, a grating coupler can similarly be configured through Equation (1) to selectively couple light so that incident light at the angle θ is primarily coupled into the associated waveguide.

Figure 5:
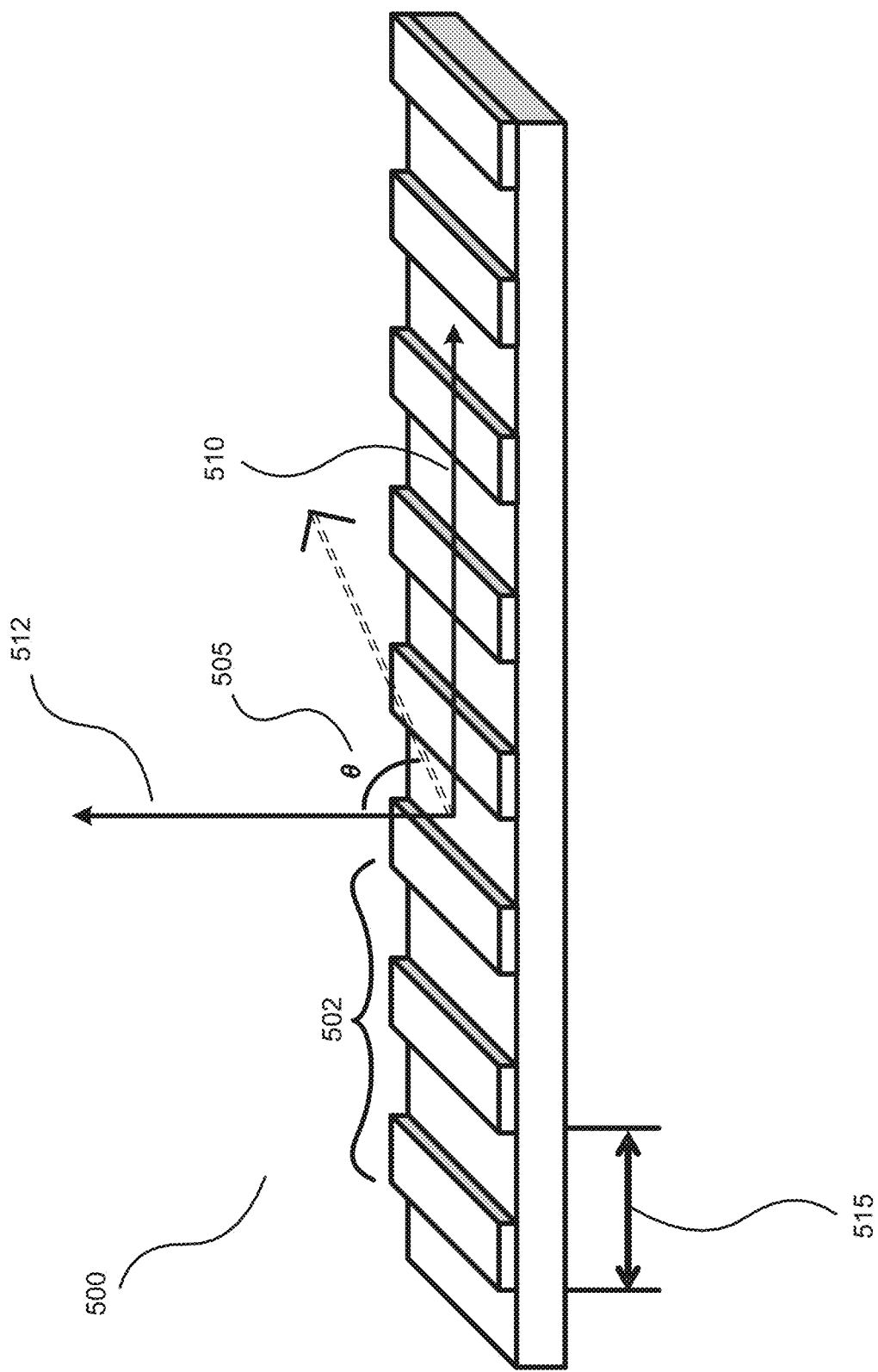
FIG. 5 illustrates a surface coupler having a grating structure configured according to an embodiment of the present invention.

FIG. 5 illustrates a surface coupler 500 having a grating structure 502 configured according to an embodiment of the present invention. The surface coupler can be primarily formed of a waveguide, for example comprising a silicon dioxide layer between upper and lower silicon layers, or formed of another pair of materials. For example, the top layer of the surface coupler in which a grating structure created may be a Silicon Nitride (SiN) overlay. A grating structure is formed in the top of surface coupler in order to create a periodic series of ridges and valleys. The grating period Λ 515 is shown for clarity as the distance between successive left edges of the ridges. The longitudinal axis 510 of the surface coupler, as well as an axis 512 perpendicular to the plane of the surface coupler are also shown. The angle θ 505, which is related to the grating period via Equation (1), is also shown. Light is emitted from the service coupler primarily at this angle. For example, the light can be emitted according to a Gaussian distribution having its peak corresponding to the emission angle θ.

It is noted that, in Equation (1), angle θ depends on the LIDAR operating wavelength λ. As such, in some embodiments of the present invention, the wavelength of LIDAR light can be adjusted over time in order to adjust the emission (or reception) angles θ of the surface couplers. This may be performed by controlling an operating frequency of an input laser coupled to the first port of the optical switch fabric, for example. The input laser source can therefore be a tunable laser source, and LIDAR beamsteering can be performed partially by adjusting the operating frequency. Alternatively, multiple input light sources having different operating wavelengths can be provided, for example coupled to different first ports. Adjusting the operating wavelength can then comprise operating the optical switch to optically couple a selected one of the input light sources to a selected second port.

As an example, for a 905 nm operating wavelength, m=1 and a grating period of 550 nm, the emission angle θ from Equation (1) is about 8.9 degrees, while for a 925 nm operating wavelength, the emission angle θ from Equation (1) is about 6.8 degrees. This results in LIDAR beamsteering capability of 0.1 degree for each 1 nm adjustment of the operating wavelength of the light source. For an operating wavelength in the 1550 nm range, similar beamsteering can be achieved using a grating period of about 630 nm.

By configuring the orientation of waveguide, the longitudinal axis direction can be set. By cooperatively setting the longitudinal axis direction and the grating period, the three-dimensional direction of light emission can be set.

According to embodiments of the present invention, the length of a surface (grating) coupler, in its longitudinal direction, can be configured to provide a desired beam shape. For example, by using a surface coupler having a greater length, the emitted (or received) beam can correspondingly be spread over a greater area. The beam can be viewed as having an approximately elliptical cross-section, where the eccentricity of the ellipse generally increases with the length of the surface coupler. That is, the length of the semi-major axis of the ellipse can be increased by increasing the surface coupler length. In some embodiments, the length-to-width ratio of a surface coupler is on the order of 10:1 or more.

In various embodiments it is desired to partition a LIDAR target region into multiple parts, where each part (or a portion thereof) can be illuminated substantially independently by LIDAR light emitted from a different surface/edge coupler. This corresponds to the design goal of configuring different surface/edge couplers to emit light in different directions. Having control over the shapes of the emitted light beams can facilitate this partitioning in view of other design constraints.

In various embodiments, in order to elongate the emitted beam from a surface coupler, the grating structure can be configured so that the amount of light coupled out per unit length of the surface coupler is limited, in order to increase the total length over which light is coupled out from the surface coupler. A surface grating coupler having a relatively weak coupling strength could be realized for example by employing a weak grating in a nitride or silicon nitride overlay. The evenness of light intensity over the length of the elongated beam could be further enhanced by apodizing the strength and/or the pitch of the grating.

In various embodiments, elongation of the emitted beam allows for a narrower surface coupler to be used, while still allowing for an adequately large beam cross-sectional area. An adequate beam cross-sectional area may be required for example in order to provide a LIDAR beam with adequately low beam divergence in one direction while maintaining a small total surface area per surface coupler.

Figure 6:
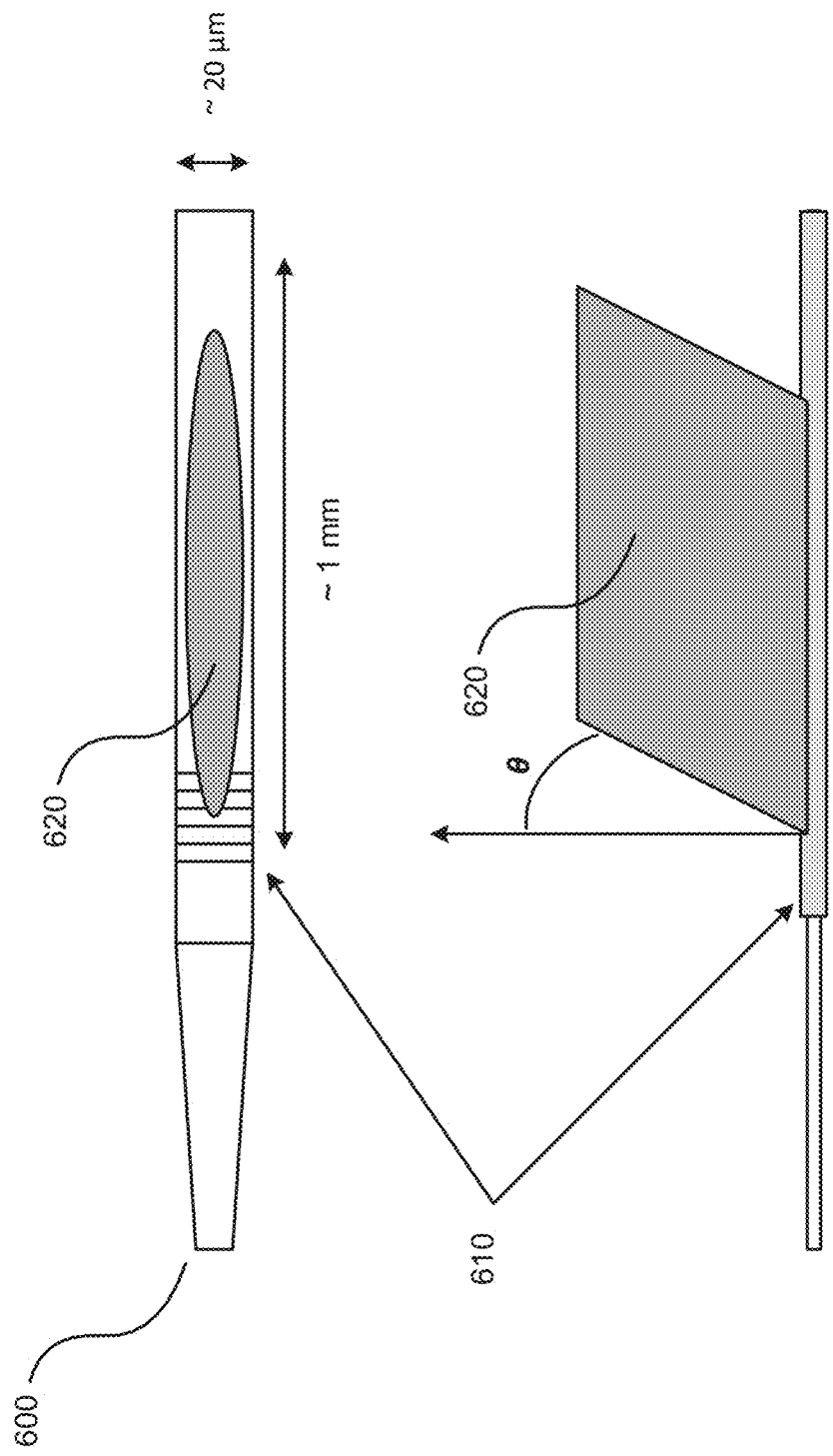
FIG. 6 illustrates top and side views of an elongated surface coupler, according to an embodiment of the present invention.

FIG. 6 illustrates top and side views of an elongated surface coupler 600, according to an embodiment of the present invention. The surface coupler can include a weak grating structure, realized for example using a shallow etch depth to define the grating, within an overlay. The grating structure covers an area 610 having an example with of about 20 micrometers and an example length of about 1 mm. The elongate shape of the emitted beam 620, which is emitted at a configured angle θ, is also shown.

In some embodiments, instead of or in addition to surface couplers, the apparatus may include one or more edge couplers operatively coupled to the optical switch. For example, part or all of the apparatus may be provided within a laminated structure such as a silicon photonics structure. The structure may be in the form of a rectangular prism having planar upper and lower surfaces, and (possibly) thinner edge surfaces. The optical switch and associated waveguide components may be disposed within the structure. To provide for an edge coupler, a waveguide is extended to the edge of the structure and exposed at one of the edge surfaces. The waveguide may be tapered or inverse tapered as it approaches the edge surface. By adjusting the physical orientation the waveguide, the taper and/or the edge surface, the light can be coupled (e.g. emitted) by the edge coupler in a corresponding desired direction. The emitting surface of an edge coupler potentially perpendicular to the direction of light propagation within the associated waveguide. As such, grating structures or other optical redirection means are not necessarily required. The direction of light emissions by an edge coupler can therefore be configured by orienting the associated waveguide longitudinal axis so that it is parallel to the desired direction of light emission. In some embodiments, a reflective surface can be disposed near the edge coupler so that light emitted by the edge coupler is redirected in a desired direction by the reflective surface. The reflective surface can be oriented to achieve this desired direction.

Figure 7:
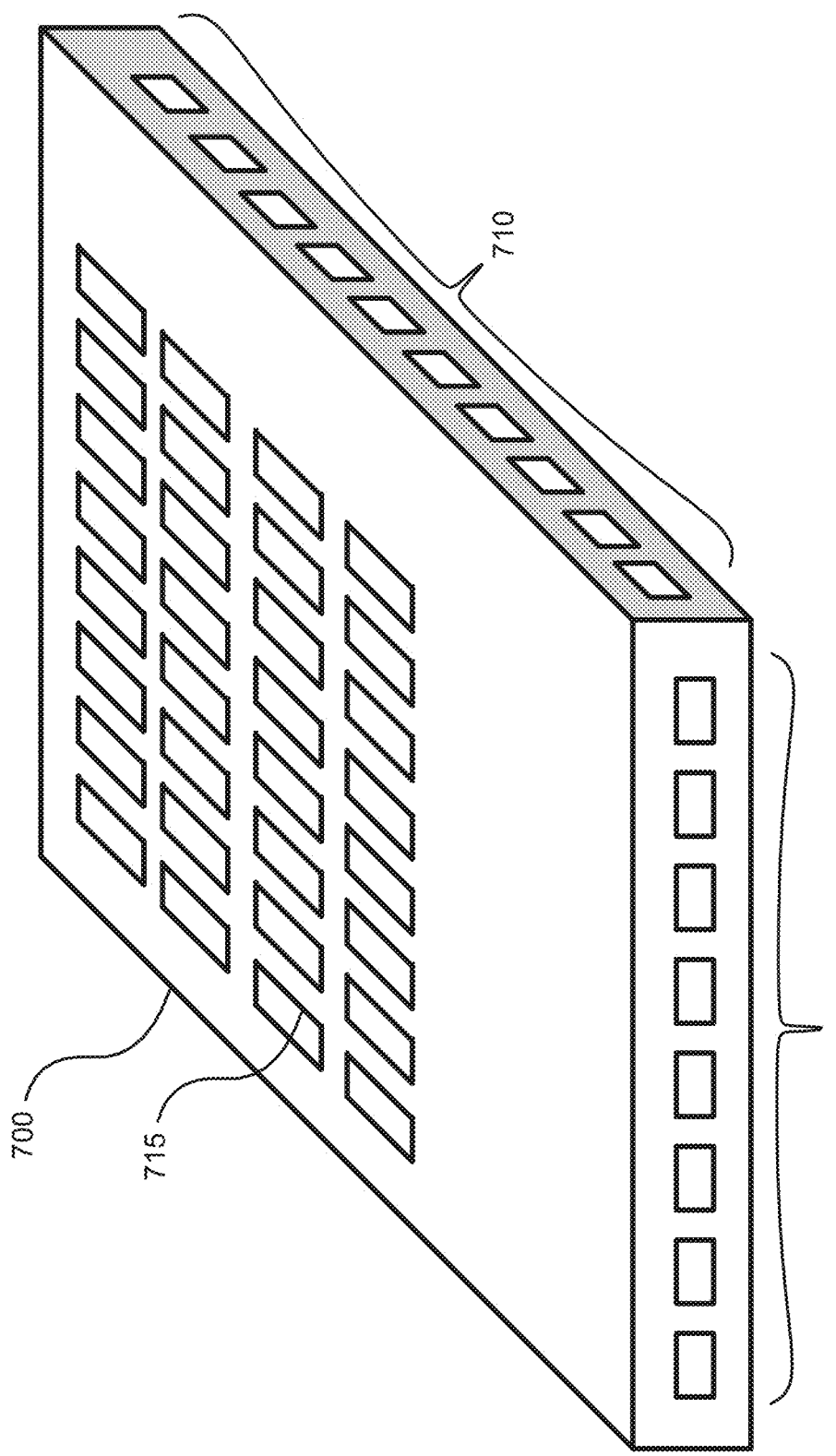
FIG. 7 illustrates a substantially planar structure of the apparatus having an array of surface couplers disposed on a top surface thereof, and edge couplers disposed on edge surfaces thereof, according to an embodiment of the present invention.

FIG. 7 illustrates a substantially planar structure 700 of the apparatus having an array of surface couplers 715 disposed on a top surface thereof, and edge couplers 710 disposed on edge surfaces thereof. In other embodiments, the edge surfaces can be made larger and multiple rows of edge couplers can be provided, for example in a two dimensional array arrangement.

In some embodiments, passive optical components configured for redirecting light emitted by surface/edge couplers can also be provided. For example, a plurality of prisms can be located in line with the surface/edge couplers, such as grating couplers. The plural prisms can be integrated within a common prism microarray which is disposed over the surface/edge couplers. Each prism can be configured to redirect light associated with a single different one of the surface/edge couplers. Different prisms can be configured (e.g. via prism angle configuration) to redirect light into the surrounding medium in different directions. This supports the configuration that each of the plurality of surface/edge couplers couples light from or to the LIDAR apparatus in a different respective direction. That is, some or all of the surface/edge couplers may be identical in design (e.g. including grating period and orientation). The plurality of prisms are optically coupled to these some or all of the plurality the surface/edge couplers and each prism has a different prism angle, to cause light emitted from each of the plurality of surface/edge couplers to propagate in a different respective direction. The prisms can similarly couple light onto the surface/edge couplers in a complementary manner, by each prism selectively coupling light incident at a different angle onto its corresponding surface/edge coupler.

In some embodiments, some or all surface/edge couplers have the same longitudinal axis orientation, or the same grating period (in the case of grating couplers), or both the same longitudinal axis orientation and the same grating period. In this case, each surface/edge couplers is associated with a different prism which has a different configuration and redirects light in a substantially unique direction.

In some embodiments, different surface/edge couplers can have different longitudinal axis orientations, grating periods, or both, and the prisms associated with such different surface/edge couplers can redirect light in different directions. As such, the combination of surface/edge couplers and associated prism configuration results in each of the plurality of surface/edge couplers (with associated prism) coupling light from or to the LIDAR apparatus in a different respective direction.

Figure 8:
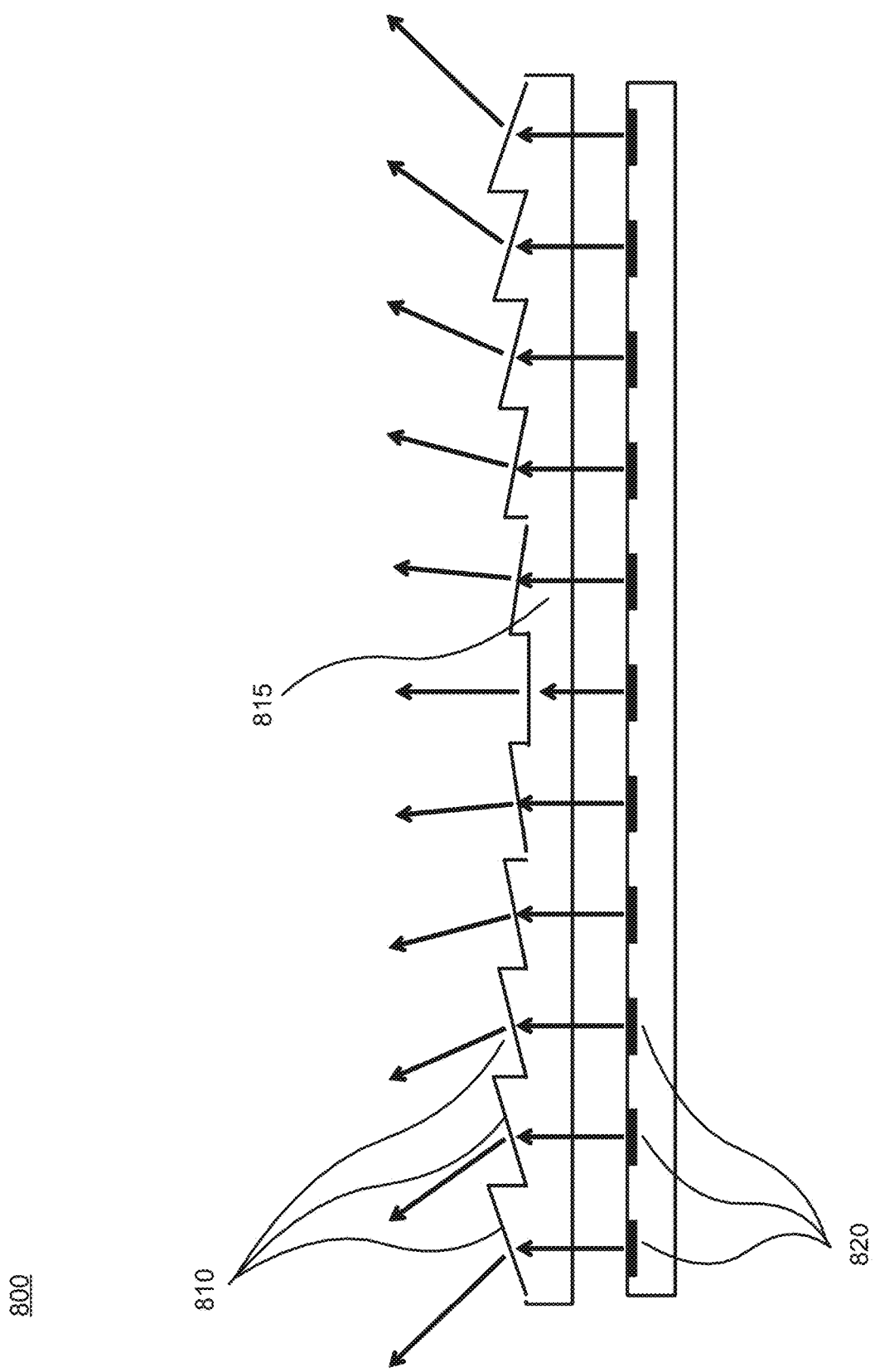
FIG. 8 illustrates, in cross-section, a plurality of prisms disposed overtop of a plurality of surface/edge couplers, according to an embodiment of the present invention.

FIG. 8 illustrates, in cross-section, a plurality of prisms 810, for example as disposed in a prism microarray 815, disposed overtop of a plurality of surface/edge couplers 820, such as grating couplers, according to an embodiment 800 of the present invention. The surface/edge couplers can be (but are not necessarily) substantially identical so as to each emit light in the same direction toward the prisms. The prisms are each configured differently so as to each redirect light in a different direction. FIG. 8 illustrates a cross-sectional view of a potentially two-dimensional array of surface/edge couplers and prisms. Although only a two-dimensional view is shown, each prism can be configured to redirect light in a different direction in three-dimensional space.

In some embodiments, the LIDAR apparatus may further include a diffractive optical element (DOE) optically coupled to some or all of the plurality of surface/edge couplers. The DOE receives light from the plurality of surface/edge couplers and spreads the received light from each surface/edge coupler into plural beams. DOEs made of various materials and used for beam shaping and splitting will be readily understood by a worker skilled in the art. They may include a diffractive microrelief pattern for manipulating the phases of incoming laser light beams in order to create a desired intensity profile in the far field.

Figure 9A:
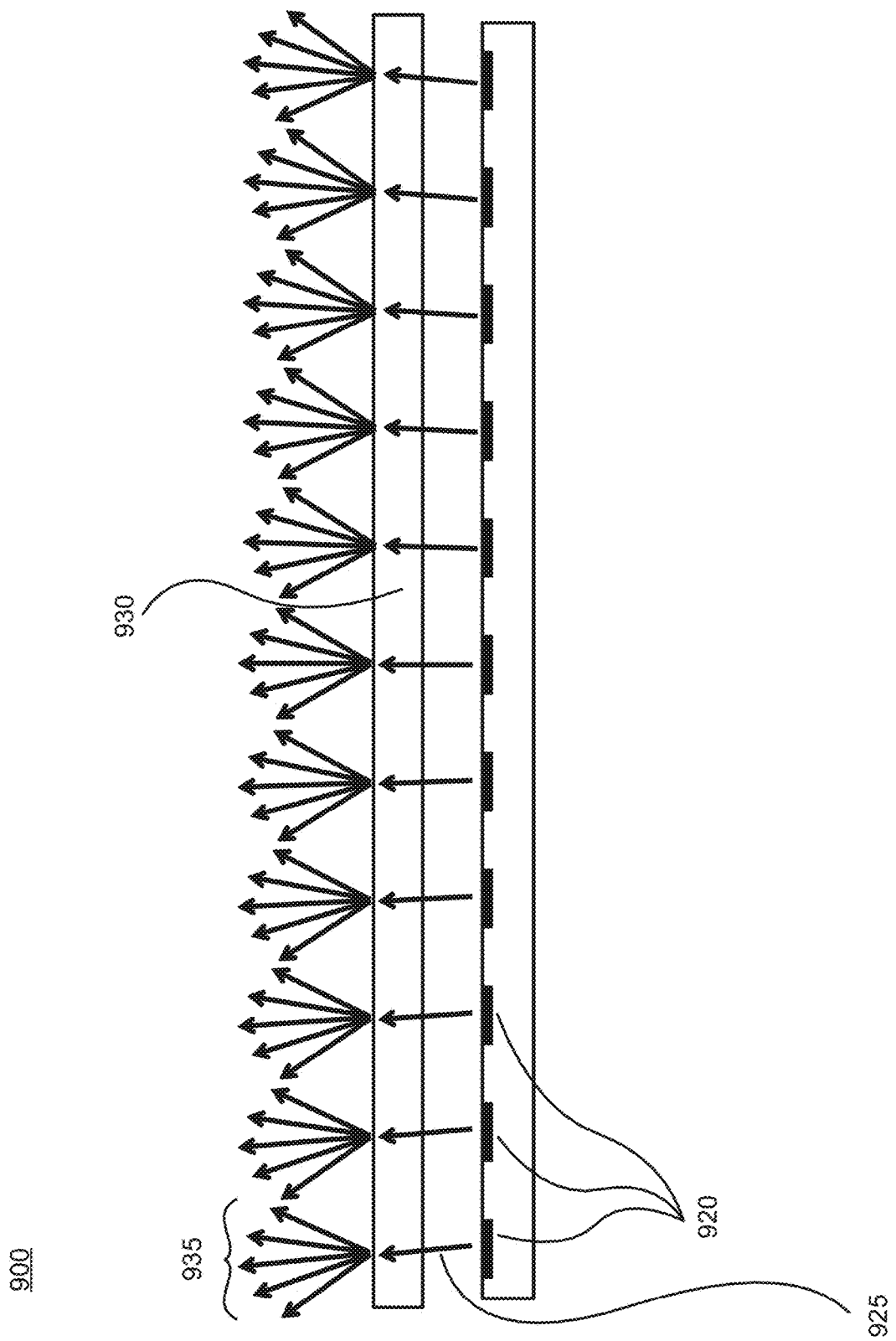
FIG. 9A illustrates, in cross-section, a diffractive optical element disposed overtop of a plurality of surface/edge couplers, according to an embodiment of the present invention.

FIG. 9A illustrates, in cross-section, a diffractive optical element (DOE) 930 disposed overtop of a plurality of surface/edge couplers 920, such as grating couplers, according to an embodiment 900 of the present invention. The DOE 930 multiplies the number of emitted beams of the LIDAR. Light 925 emitted by each surface/edge couplers is received by the DOE, which splits the light into a plurality 935 of dispersing beams. Each of the surface/edge couplers may be operated in sequence, and a LIDAR receiver comprising a number of detectors equal to the number of split beams may be used to detect the plurality of beams as described in International Patent Application No. PCT/CA2017/050566. The LIDAR receiver may be further configured to have an imaging lens system for receiving diffused light from each of the beams. This operation may be used for each LIDAR emitter. As illustrated, the different surface/edge couplers emit light in different directions, for example through different longitudinal axis orientation, different grating periods (where applicable), or use of a different prism disposed overtop thereof, or a combination thereof.

Figure 9B:
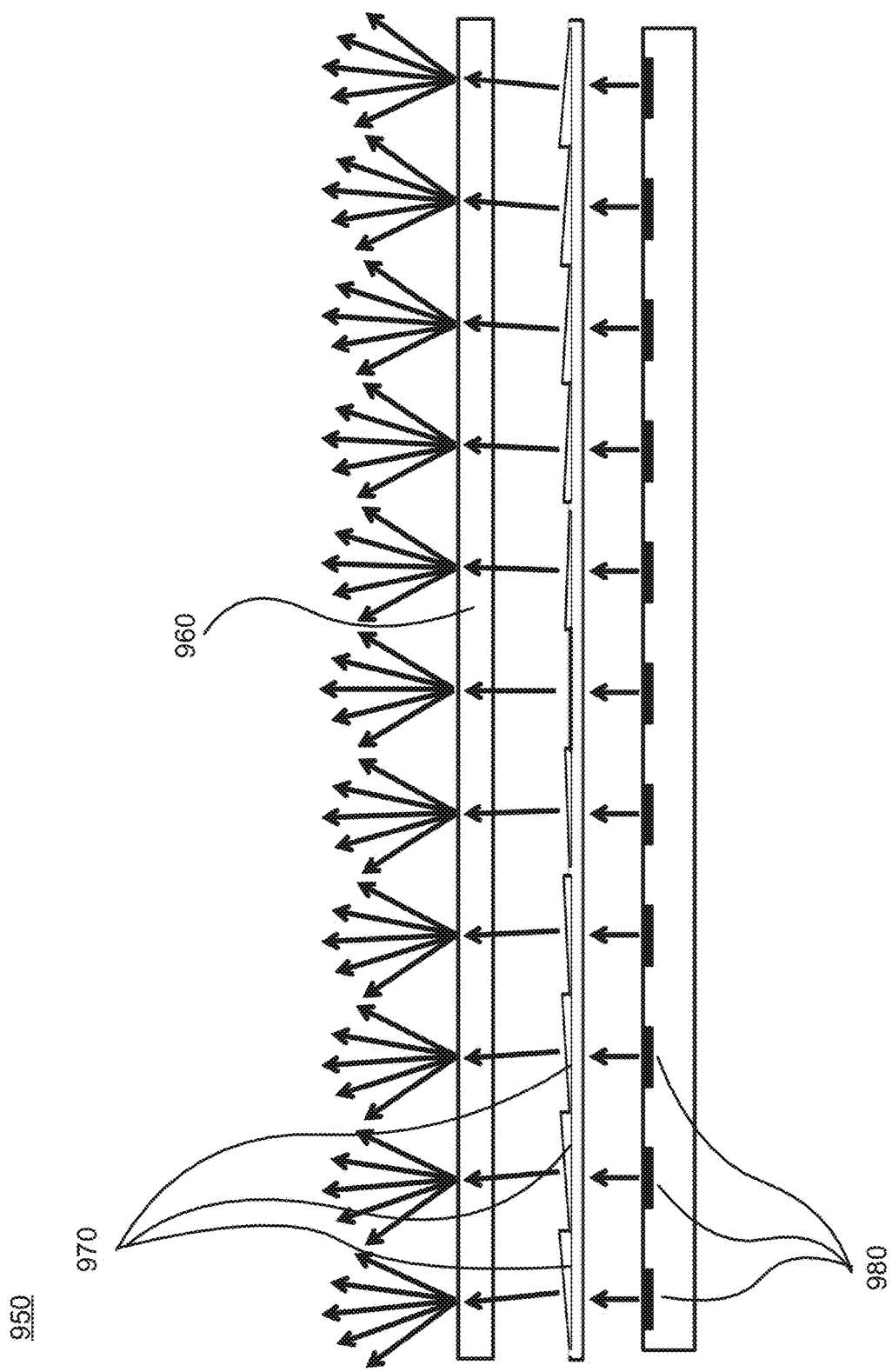
FIG. 9B illustrates, in cross-section, a diffractive optical element disposed overtop of a plurality of prisms and surface/edge couplers, according to an embodiment of the present invention.

FIG. 9B illustrates, in cross-section, a diffractive optical element (DOE) 960 disposed overtop of a plurality of prisms 970 (e.g. in a prism microarray) which are in turn disposed overtop of a plurality of surface/edge couplers 980, such as grating couplers, according to an embodiment 950 of the present invention. The surface/edge couplers 980 may be (but are not necessarily) similar to one another in terms of orientation and grating period (where applicable), so that each emits light in substantially the same direction. The prisms 970 operate as described with respect to FIG. 8 to redirect light from different surface/edge couplers toward different directions. Each prism can redirect light from a single surface/edge coupler associated therewith. Light emitted by each surface/edge couplers and redirected by the prisms 970 is received by the DOE 960, which splits the light into a plurality of dispersing beams as described with respect to FIG. 9A. FIG. 9B thus represents a combination of FIGS. 8 and 9A. The prisms 970 as shown are not as pronounced as the prisms 810 of FIG. 8, due to the relatively smaller directional adjustments required in the present embodiment.

Controller

Embodiments of the present invention include an electronic controller configured to control operation of the optical switch and optionally also the light source(s), light detector(s), or both, operatively coupled thereto. The controller operates the optical switch to establish light paths between first port and second ports thereof at different times. For LIDAR emission, the different light paths can cause source light to be routed to and emitted by different surface/edge couplers at different times. For LIDAR reception, the different light paths can cause light received at different surface/edge couplers to be routed to a light detector at different times. By operating the optical switch in this manner (e.g. periodically), a discrete LIDAR scanning operation can be performed.

In some embodiments, the controller also operates the light source, for example to adjust the wavelength thereof over time. As discussed above, adjusting the wavelength can cause responding adjustment in direction of light emitted by (or received by) grating couplers. This adjustment can therefore also be used to implement LIDAR scanning.

In some embodiments, the controller can control the optical switch by controlling each of one or more phase shifters of each 1×2 or 2×2 switching cell of the optical switch fabric. Controlling phase shifters of a 1×2 or 2×2 MZI switching cell to cause light to be routed to a selected output port thereof will be readily understood by a worker skilled in the art. Controlling a plurality of switching cells to establish a desired light path will also be readily understood by a worker skilled in the art.

Figure 10:
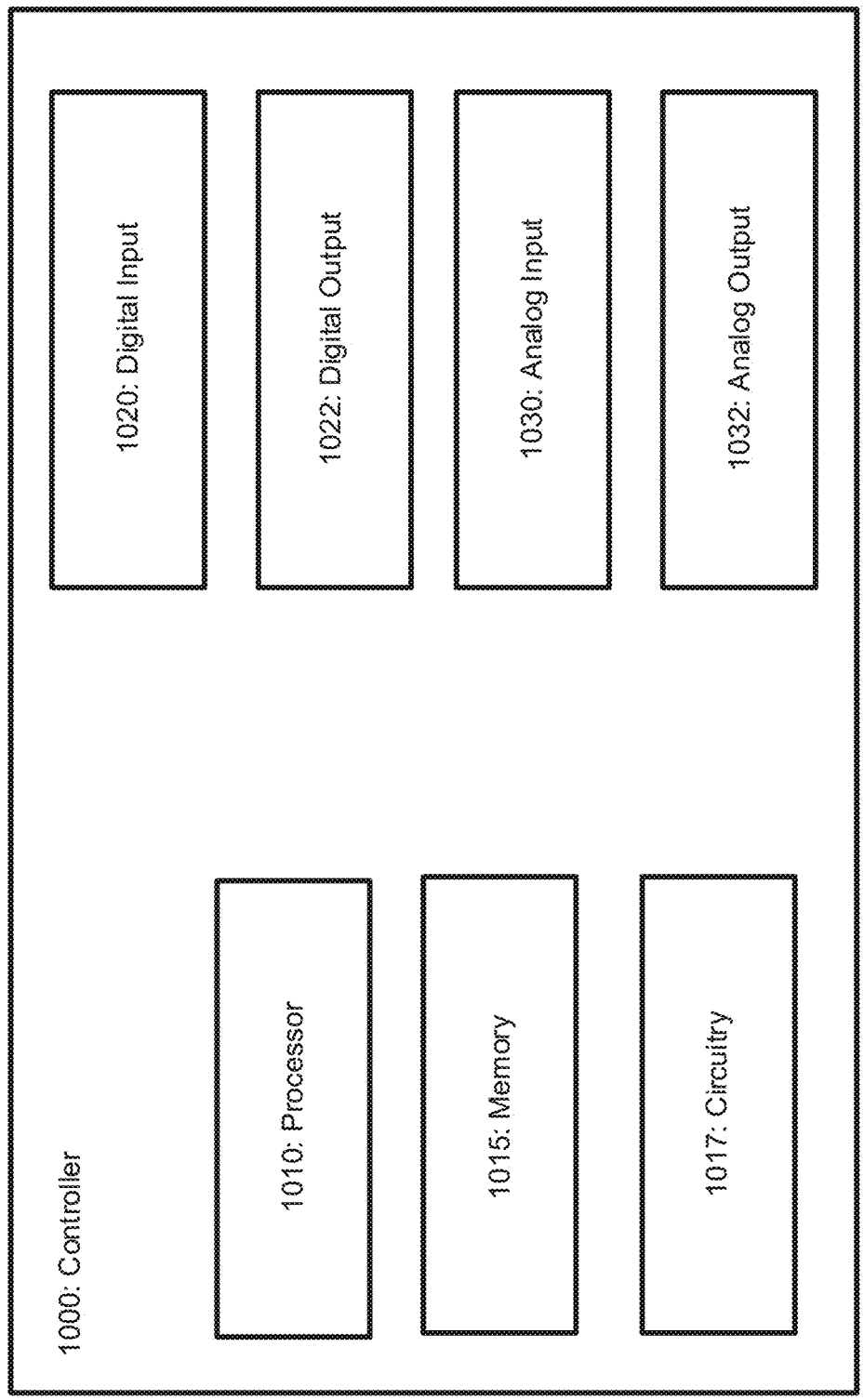
FIG. 10 illustrates a controller for operating a LIDAR apparatus, in accordance with an embodiment of the present invention.

FIG. 10 illustrates a controller 1000 provided in accordance with an embodiment of the present invention. The controller 1000 includes a computer processor 1010 operatively coupled to memory 1015 and configured to execute computer program instructions stored in the memory. Additionally or alternatively, the controller 1000 may include other logic circuitry 1017 for directing controller operation, such as application specific integrated circuits (ASICs), or field programmable gate arrays (FPGAs). The controller further includes one or more digital input ports 1020, one or more digital output ports 1022, one or more analog input ports 1030, one or more analog output ports 1032, or a combination thereof. Analog inputs and outputs can be implemented using analog to digital or digital to analog conversion circuitry. The digital or analog outputs can be driven with appropriate signals for controlling the optical switch as described above. The digital or analog outputs can also be driven with signals for controlling the light source(s) or light detector(s). The digital or analog inputs can receive external command or control signals, light detector readings, feedback used in operation of the controller, or a combination thereof.

In some embodiments, the controller receives and input indicative of a desired light direction in which LIDAR light is to be emitted (or received), determines a surface/edge coupler which emits (receives) light in the desired direction, and operates the optical switch to route light to (or from) the determined surface/edge coupler. The controller may operate the light source, for example to turn on or turn off a light source or adjust its operating wavelength. There may operate a light detector, for example to trigger acquisition of a reading therefrom. The controller may implement a LIDAR scanning operation by repeatedly establishing optical paths between selected first ports and selected second ports according to a scanning schedule.

Other Features

Figure 11:
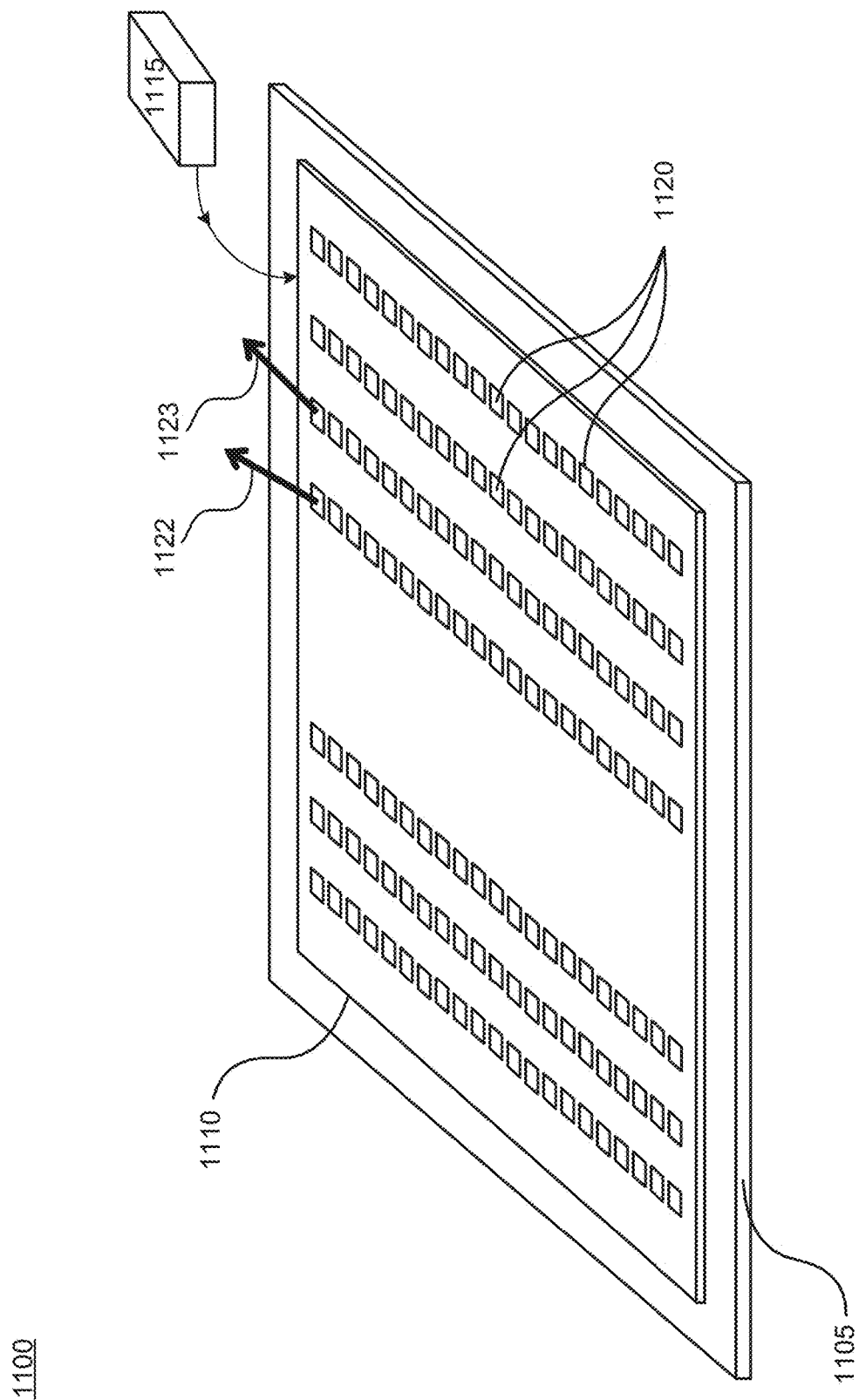
FIG. 11 illustrates a planar LIDAR apparatus having linearly arranged surface couplers provided in accordance with an embodiment of the present invention.

FIG. 11 illustrates a LIDAR apparatus 1100 provided in accordance with an embodiment of the present invention. The apparatus comprises a substrate 1105 within or upon which an optical switch 1110 is disposed. A laser light source 1115 is operatively coupled to a first port of the optical switch 1110. The apparatus further includes a plurality of surface/edge couplers 1120, each of which is operatively coupled to a different second port of the optical switch 1110. Different ones of the surface/edge couplers 1120 are configured to emit light from the LIDAR apparatus in different directions, for example as illustrated by beams 1122 and 1123.

Figure 12:
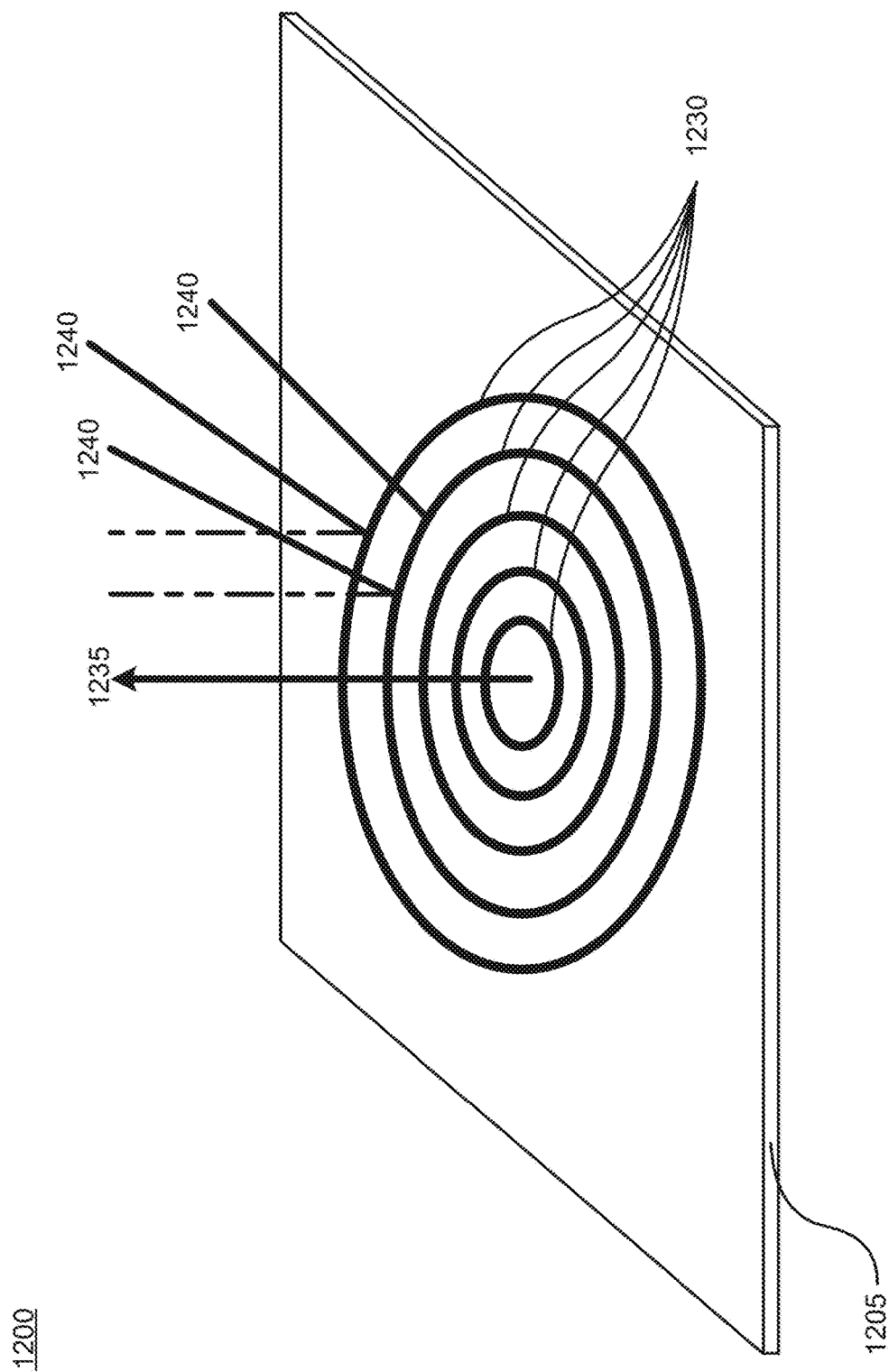
FIG. 12 illustrates a LIDAR apparatus having circularly arranged surface couplers provided in accordance with another embodiment of the present invention.

FIG. 12 illustrates a LIDAR apparatus 1200 provided in accordance with another embodiment of the present invention. The apparatus again comprises a substrate 1205 within which an optical switch is disposed. The apparatus further includes a plurality of surface/edge couplers each operatively coupled to a different second port of the optical switch. Different ones of the surface/edge couplers are configured to emit light from the LIDAR apparatus in different directions. In contrast with FIG. 11, the surface/edge couplers are arranged in a plurality of concentric rings 1230. Each ring 1230 includes a plurality of surface/edge couplers (e.g. grating couplers) disposed thereon, similarly to FIG. 14. Couplers may be spaced apart from one another by a predetermined amount or substantially adjacent. Each of the surface/edge couplers may have its longitudinal axis oriented in a different direction so as to emit light primarily in the corresponding different direction. In various embodiments, therefore, the surface/edge couplers can be a disposed in a circular pattern. In various embodiments, therefore, the surface/edge couplers can be a disposed in a pattern comprising a plurality of concentric circles or rings.

It is noted that, rather than arranging the surface/edge couplers along the entire circumference of a ring, the surface/edge couplers may be arranged around a partial circumference of a ring. For example, the surface/edge couplers arranged in semicircular patterns.

In some embodiments, the grating periods of all grating couplers within the same ring 1230 are substantially equal. Furthermore, the grating periods of grating couplers different rings 1230 are different. Furthermore, each grating coupler may be arranged so that its longitudinal axis extends radially outward from a central axis 1235 located in the centre of the plurality of concentric rings and extending perpendicularly from the substrate surface. Example emission paths 1240 for selected grating couplers are shown.

The grating periods may be configured so that, for each grating coupler in a first ring and each grating coupler in a second ring surrounding (i.e. outward from) the first ring, the emission angle θ of the grating coupler in the first ring is smaller than the emission angle θ of the grating coupler in the second ring. Therefore, light emitted by the totality of grating couplers in a given ring 1230 lies substantially on a conical surface centered on the central axis 1235, and a particular opening angle given as the angle θ. Different conical surfaces of different rings will have different opening angles. Therefore, LIDAR scanning of a target area closer to the central axis 1235 is performed by operating grating couplers within relatively interior rings, while LIDAR scanning of a target area further from the central axis 1235 is performed by operating grating couplers within relatively exterior rings.

Figure 13A:
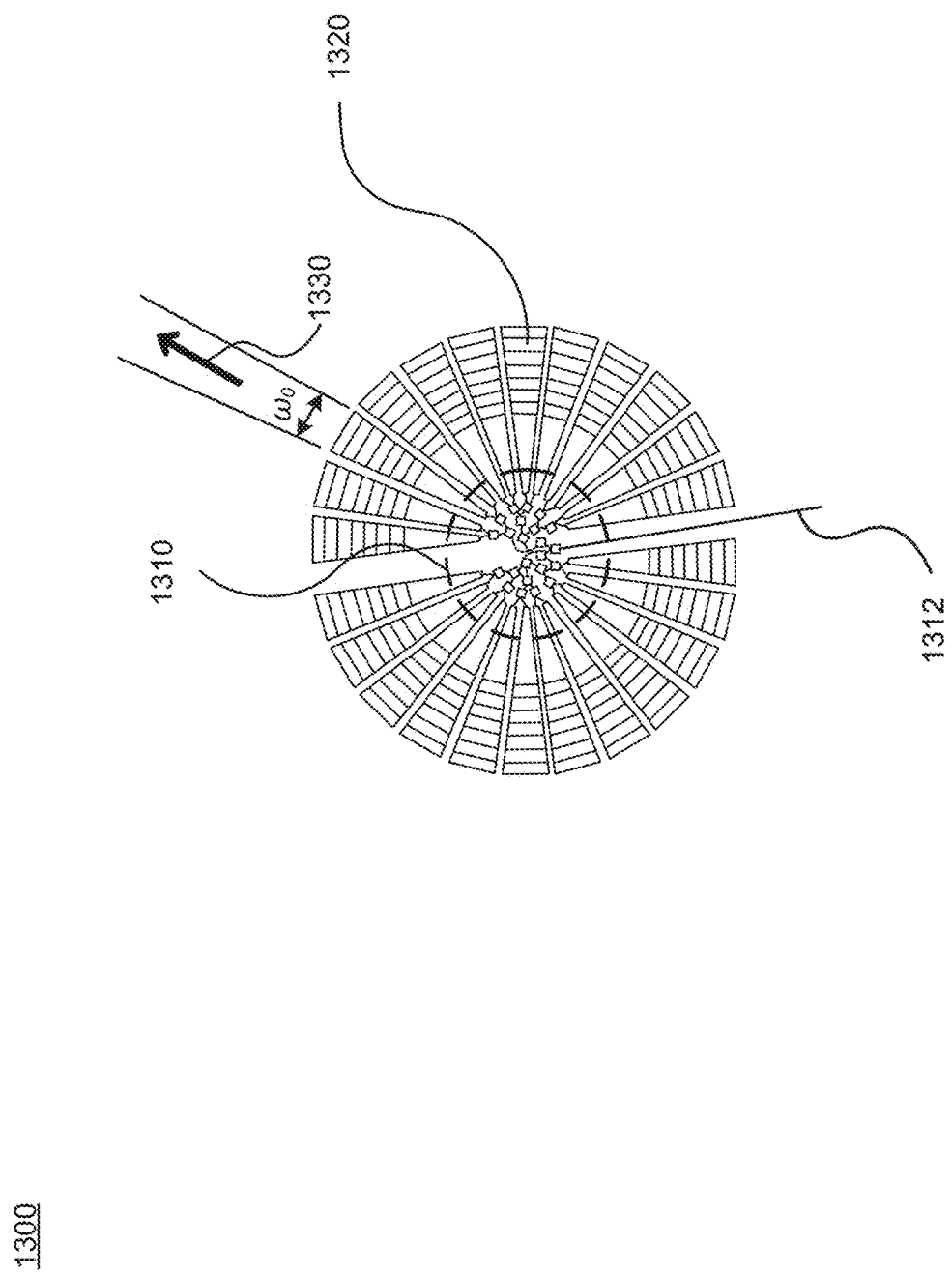
FIG. 13A illustrates a top view of a plurality of grating couplers arranged in a ring shape, according to an embodiment of the present invention.
Figure 13B:
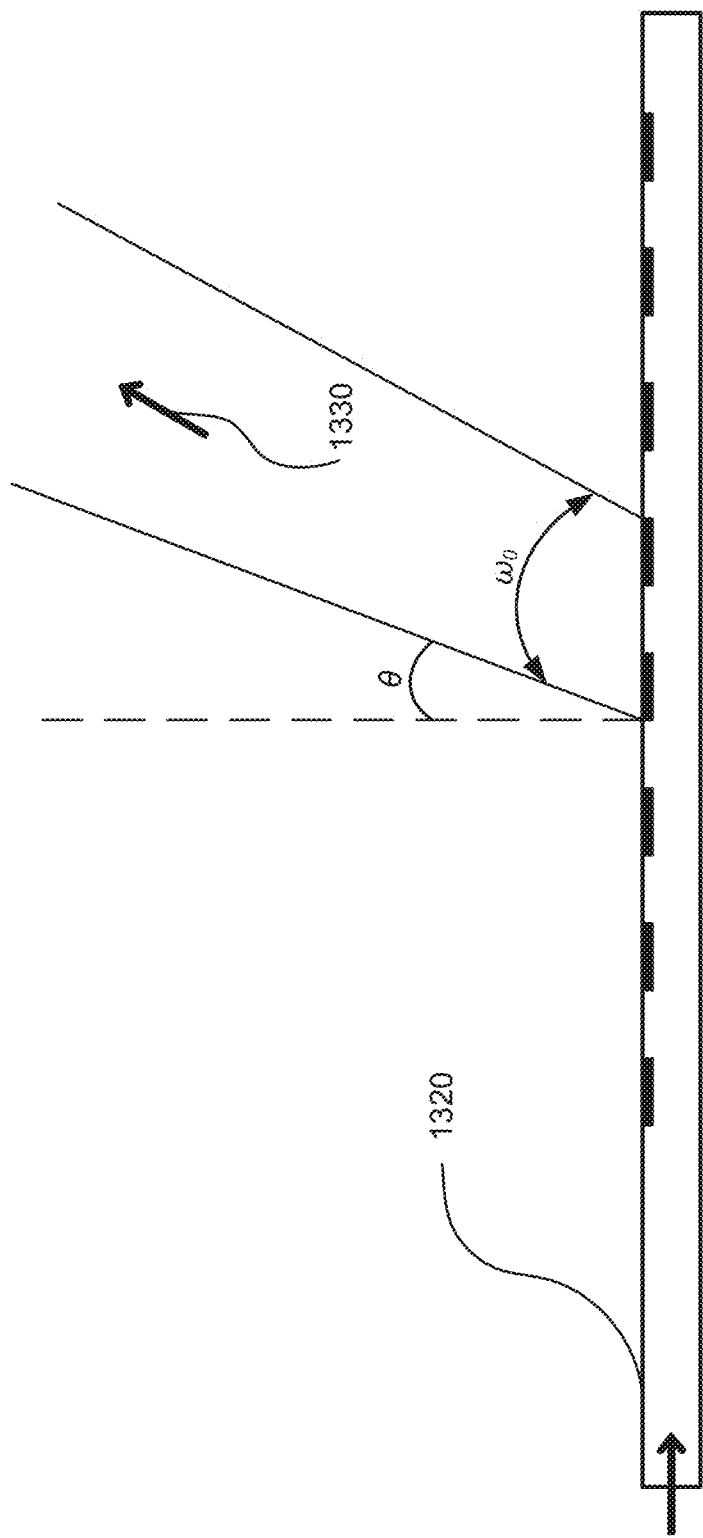
FIG. 13B illustrates a side view of one of the grating couplers of FIG. 13A.

FIG. 13A illustrates a top view of a plurality of grating couplers, including an illustrative coupler 1320, arranged in a ring shape, according to an embodiment of the present invention. The ring may be one of several concentric rings of a larger array of grating couplers. As shown, each grating coupler has its longitudinal axis extending radially outward from a centre of the ring shape. The plurality of grating couplers are coupled to a first port or feed 1312 via an optical switch network 1310. FIG. 13B illustrates a side view of the grating coupler 1320 of FIG. 13A, including the direction at which light is emitted from the grating coupler, given by emission angle θ. FIGS. 13A and 13B collectively illustrate the emission of light 1330 outward from the central axis of the ring as well as upward from the surface of apparatus upon which the grating couplers are disposed. The emission angle depends on the direction of the grating coupler's longitudinal axis and the grating coupler's grating period.

In various embodiments, the divergence of the emitted light beam depends on size of the grating coupler which is emitting the light beam.

Figure 16:
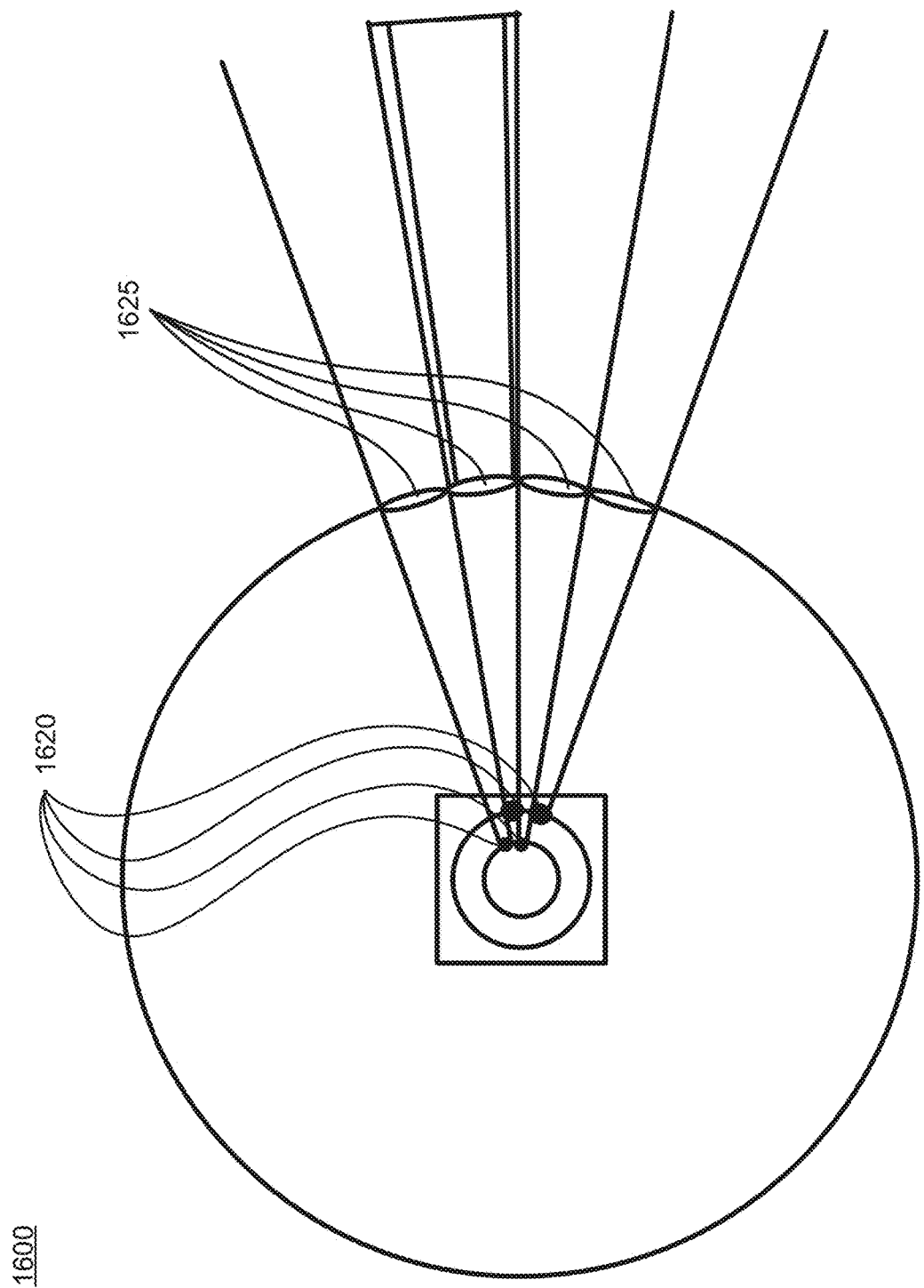
FIG. 16 illustrates an example of a plurality of surface/edge coupler emitters and lenses, according to an embodiment of the present invention.

In an example embodiment following the layout of FIGS. 13A and 13B, 16 rings of emitters, having 2880 emitters total can be provided. The width of each emitter can be about 369 micrometers, with a beam waist of about 132 micrometers (for an operating wavelength of 905 nm). This can result in a beam divergence of about 0.13 degrees. The average ring diameter is about 23 mm.

Table 1 below shows parameters for several example embodiments employing multiple discrete emitters having elliptical beams. An operating wavelength of 905 nm is assumed, and a maximum die size of about 25 mm by 32 mm may be assumed. LIDAR resolution and beam parameters are specified. Even if azimuthal resolution is limited, radial resolution in these embodiments can be increased while maintaining a reasonable die area. This is considered to result in a scalable LIDAR. Note that in the case of 0.1 degree radial resolution, a reduction of the azimuthal field of view would be necessary in order for the sum of emitter areas to not exceed the typical emitter chip size.

TABLE 1

| Radial Resolution (degrees) | 1 | 0.5 | 0.25 | 0.2 | 0.1 |
|---|---|---|---|---|---|
| Emitted Beam Radius (Semimajor Axis, radial orientation) (μm) | 33 | 66 | 132 | 165 | 330 |
| Emitter Size (Semimajor Axis, radial orientation) (μm) | 99 | 198 | 396 | 495 | 990 |
| Azimuthal Resolution (degrees) | 2 | 2 | 2 | 2 | 2 |
| Emitted Beam Radius (Semimajor Axis, azimuthal orientation) (μm) | 17 | 17 | 17 | 17 | 17 |
| Emitter Size (Semimajor Axis, azimuthal orientation) (μm) | 50 | 50 | 50 | 50 | 50 |
| # Emitters per azimuthal angle | 360 | 720 | 1440 | 1800 | 3600 |
| Sum of emitter Areas for 360° radial, 90° azimuthal coverage (mm²) | 45 | 90 | 405 | 675 | 2655 |

Figure 14:
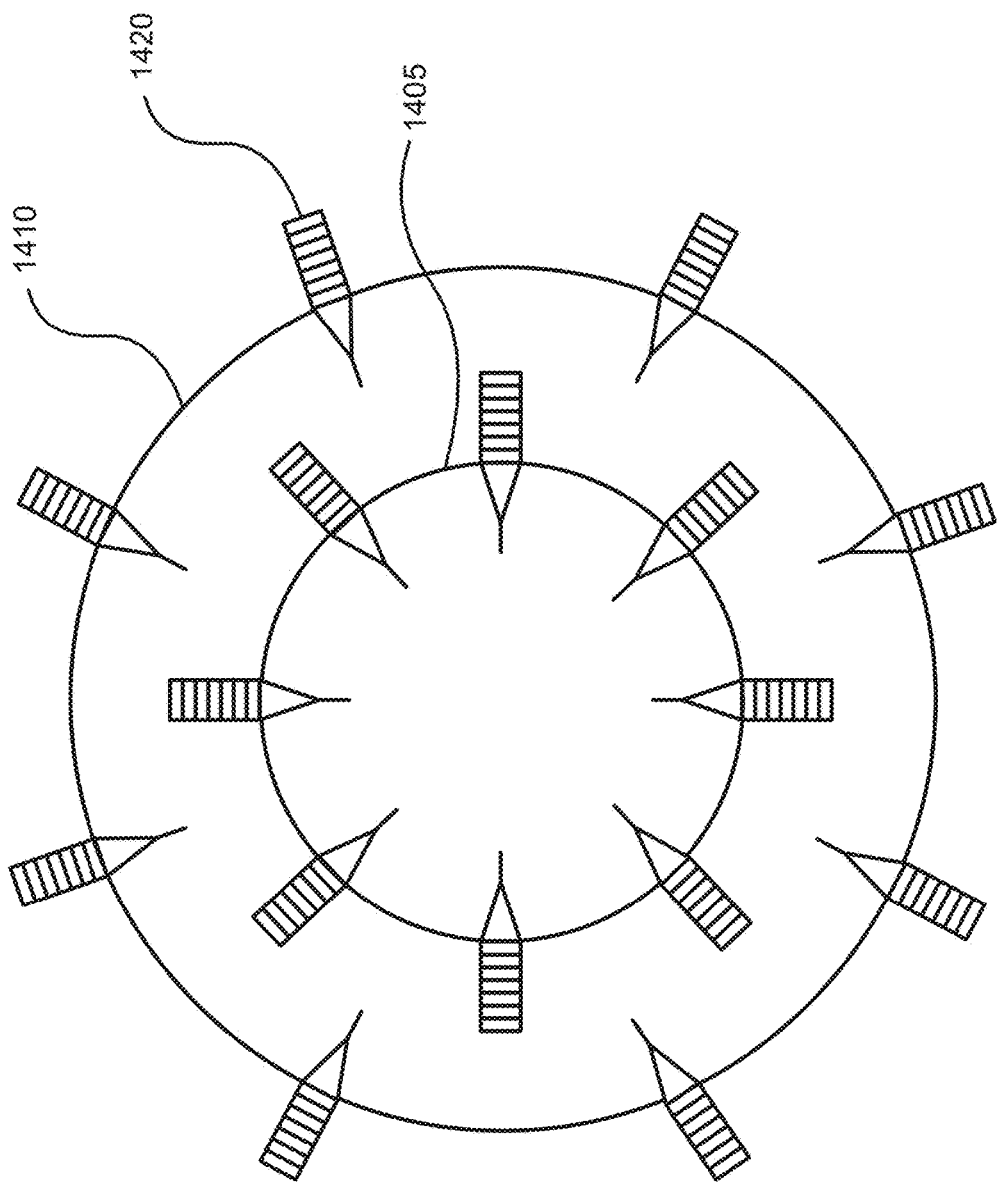
FIG. 14 illustrates a top view of a plurality of grating couplers arranged around the circumference of a pair of concentric rings, according to an embodiment of the present invention.

FIG. 14 illustrates a top view of a plurality of grating couplers 1420 arranged around the circumference of a pair of concentric rings 1405, 1410, according to an embodiment 1400 of the present invention. Additional grating couplers (not shown) arranged around the circumference of each of the concentric rings may also be included.

In various embodiments, lenses, such as microlenses, can be located along the optical path of light emitted by (or directed to) a surface/edge coupler. For definiteness, the surface/edge couplers are optically located between the lenses and the optical switch. The lenses can be configured to direct or focus light emitted by the respective surface/edge coupler (or light directed thereto). Such lenses may be used to limit or reduce beam divergence of emitted light. This may be significant when the size of the surface/edge coupler is limited, for example due to physical layout requirements. It may be desirable to limit beam divergence in order to provide an adequate level of LIDAR resolution.

Figure 15:
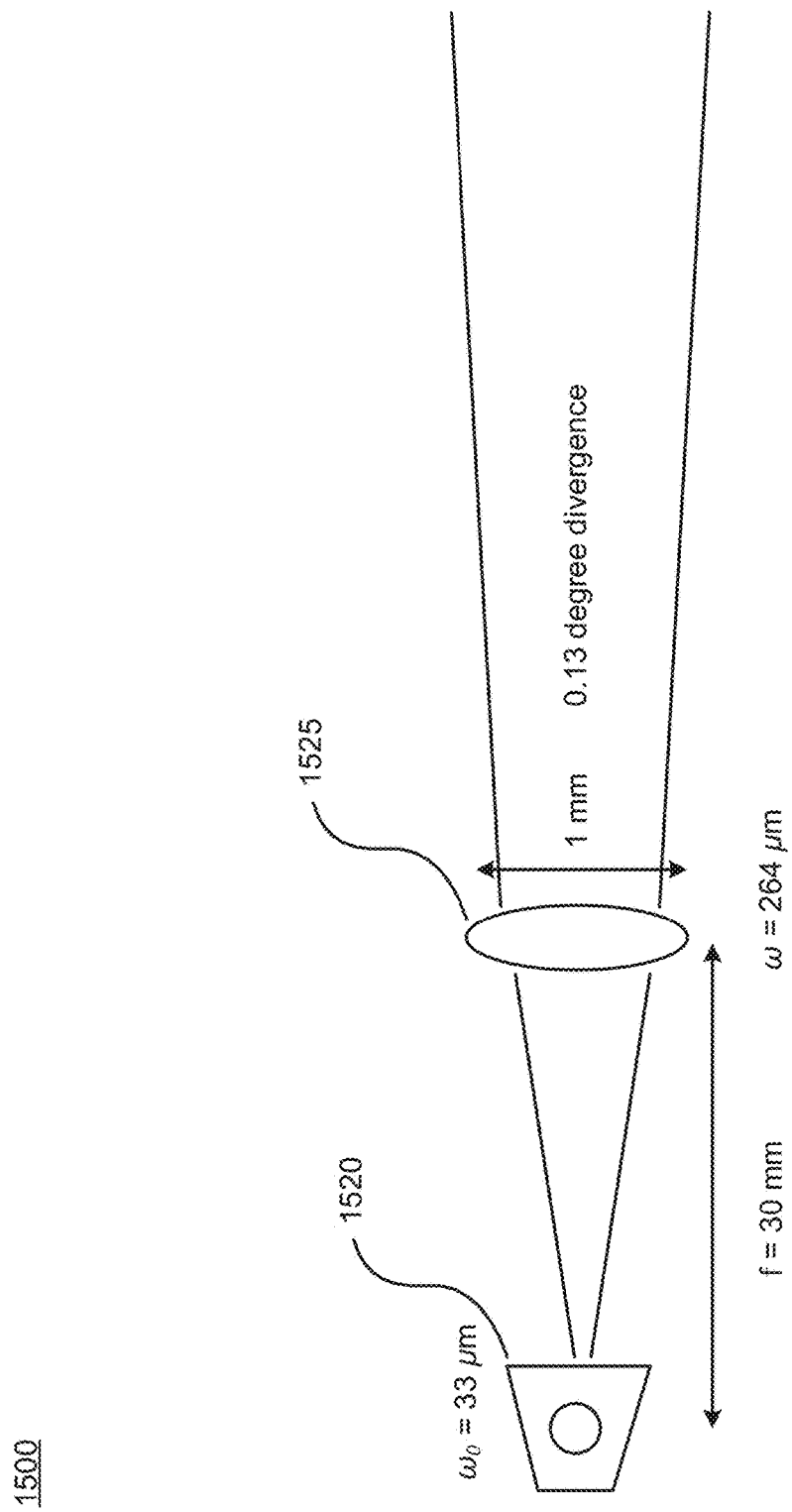
FIG. 15 illustrates an example of a surface/edge coupler emitter and a lens, according to an embodiment of the present invention.

FIG. 15 illustrates an example of a surface/edge coupler emitter 1520 and a lens 1525, according to an embodiment 1500 of the present invention. The lens 1525 reduces beam divergence of light following emission by the emitter 1520 into the surrounding medium. By way of example, the beam radius at the emitter may be 33 micrometers, the lens 1525 may be spaced apart from the emitter 1520 by a distance of 30 mm (equal to about one focal length of the lens), the beam diameter at the lens may be about 264 micrometers, and the lens may have a width of between about 0.79 mm and 1 mm. The beam divergence following action of the lens 1525 may be about 0.13 degrees. The apparatus may include about 2880 emitters arranged in four concentric rings. Each emitter may be associated with a different respective lens. The lenses may be arranged on a transparent three-dimensional surface disposed outward from the emitters, for example.

FIG. 16 illustrates an example of a plurality of surface/edge coupler emitters 1620 and lenses 1625, according to an embodiment 1600 of the present invention. The emitters 1620 are arranged around the circumferences of a pair of concentric rings. Only a subset of all emitters and lenses are shown. The lenses 1625 receive and focus the light from their corresponding emitters 1620. The lenses can be arranged around the circumference of a circle that is concentric with the pair of rings.

Figure 17:
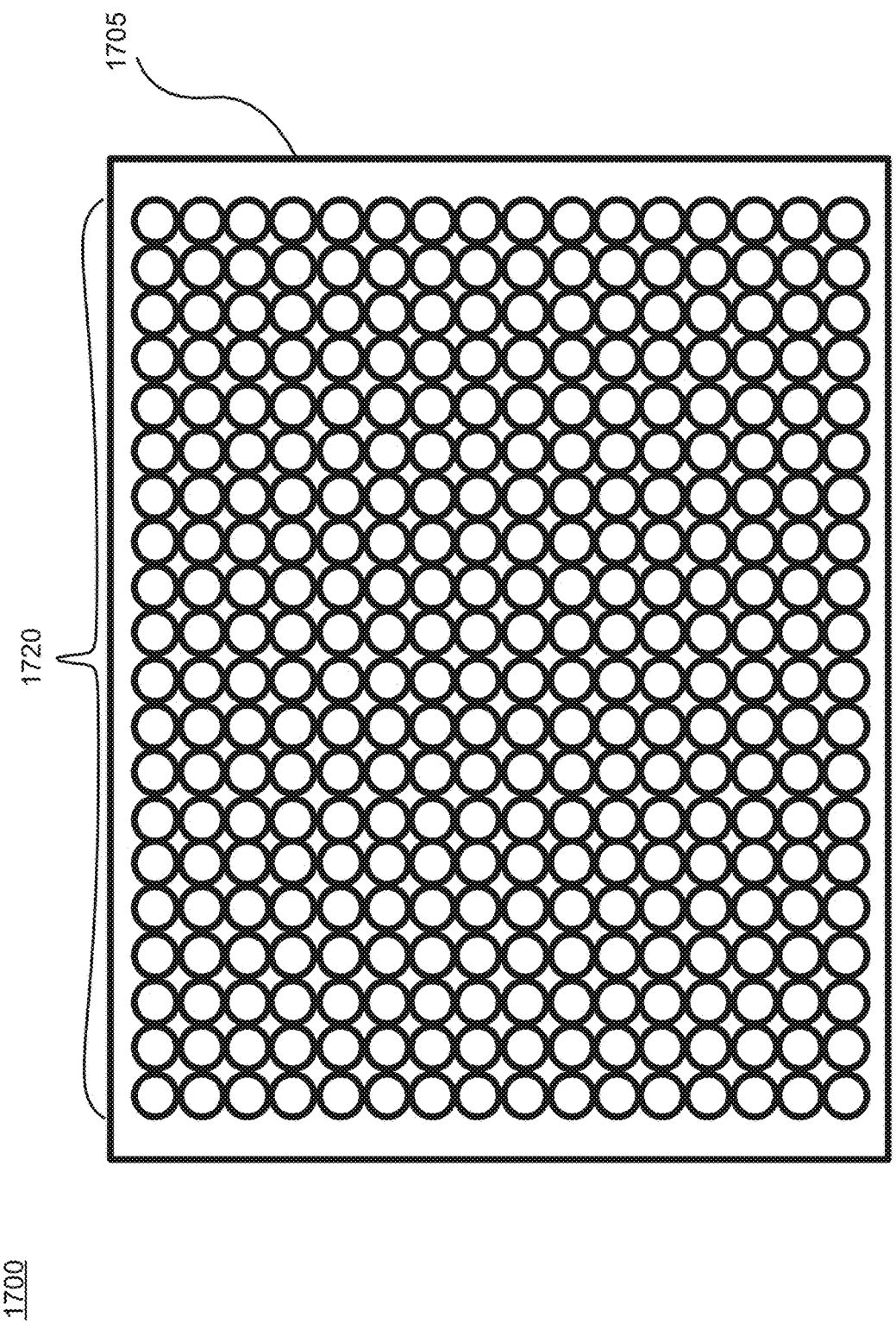
FIG. 17 illustrates an example of a plurality of surface/edge coupler emitters arranged in a regular rectangular grid pattern on a common substrate, according to an embodiment of the present invention.

FIG. 17 illustrates an example of a plurality of surface/edge coupler emitters 1720 arranged in a regular rectangular grid pattern on a common substrate 1705, according to an embodiment 1700 of the present invention. Each different surface/edge coupler emitter 1720 may be configured to emit light at a different angle. This may be achieved by angular orientation of the (e.g. longitudinal axis) of the emitter and optionally also the grating period thereof, if applicable.

Figure 18:
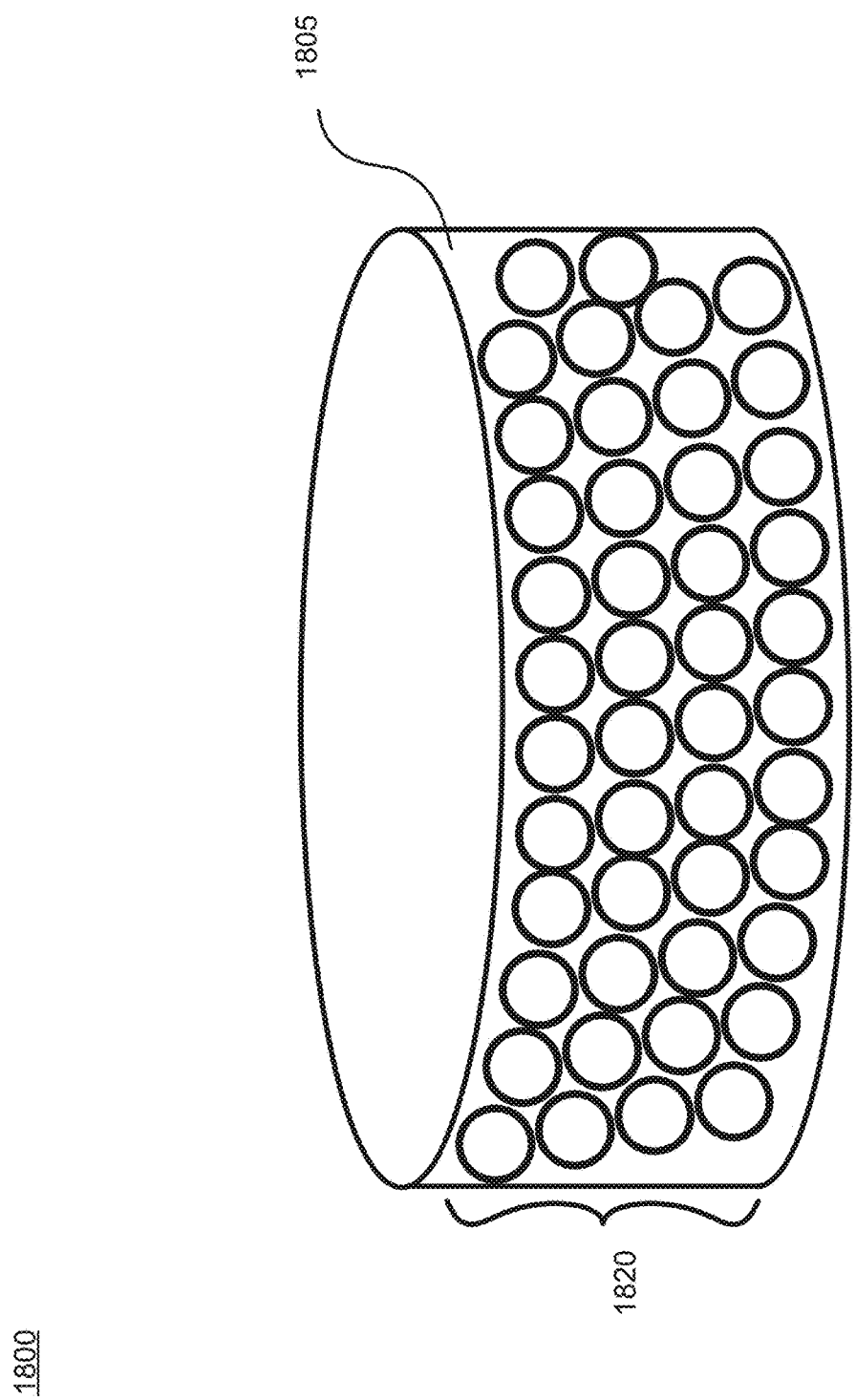
FIG. 18 illustrates an example of a plurality of surface/edge coupler emitters arranged on the surface of a cylindrically curved substrate, according to an embodiment of the present invention.

FIG. 18 illustrates an example of a plurality of surface/edge coupler emitters 1820 arranged on the surface of a cylindrically curved substrate 1805, according to an embodiment 1800 of the present invention.

FIG. 19 illustrates a method 1900 for operating a LIDAR device according to an embodiment of the present invention. The method includes receiving 1910 an indication of a first direction in which to emit light from or receive light to the LIDAR device at a first time. The method includes operating 1920 an optical switch to route light between a first port of the optical switch and a selected one of a plurality of second ports of the optical switch at the first time. The first port is coupled to a light source or a light detector. Each of the plurality of second ports is coupled to a different respective one of a plurality of surface/edge couplers. Each of the plurality of surface/edge couplers is configured to couple light from or to the LIDAR apparatus in a different respective direction. The selected one of a plurality of second ports is coupled to a respective one of the plurality of surface/edge couplers which is configured to couple light in the first direction. The method may be performed repeatedly at successive times to emit light in different directions or receive light in different directions by varying which one of the second ports light is routed to or from.

According to various embodiments of the present invention, one or multiple optical switches can be deployed on the same common substrate, along with surface/edge coupler operatively coupled thereto. In some embodiments, multiple cascades or multiple layers of switches may be provided for example using two-dimensional, 2½ dimensional, or three-dimensional interposers.

Embodiments of the present invention can be implemented as a photonic integrated circuit, silicon photonics device, planar laminate structure, Silicon on Insulator structure, or other type of structure configurable to provide optical components such as switching cells, waveguides, and surface/edge couplers therein. The optical components can be provided in a multilayered laminated structure built using lithographic manufacturing techniques, for example. A photonic die can be manufactured having the optical switching fabric and surface/edge couplers integrated therein.

Embodiments of the present invention are scalable in the sense that a potentially large number of surface/edge couplers can be provided on a corresponding adequate size surface. This provides for scalability in LIDAR resolution, field-of-view, or a combination thereof. Scalability is facilitated by the capability to manufacture an optical switch having a substantially arbitrary number of second ports.

In view of the above, it will be readily understood that embodiments of the present invention provide an optical integrated circuit comprising a light inlet (first port), a plurality of surface emitting grating couplers, and an optical switching circuit. The plurality of surface grating couplers are disposed and configured so that the emitted light beam from each surface grating coupler is directed toward different angular coordinate in the far field. The optical switching circuit is controllable to direct an optical signal incident upon the light inlet toward the selected one of the surface grating couplers.

In some embodiments, the LIDAR field of view (far field) can be separated into a plurality of radial slices, with each radial slice representing a substantially wedge-shaped region to be separately scanned using a separate surface coupler. In some embodiments, when the number of radial slices exceeds the number of surface couplers that can be disposed around the perimeter of the same circle within a given area on the apparatus, the surface couplers (emitters) are instead disposed in two or more concentric circular ring patterns. In this case, each successive radial slice of the far field may be addressed by successive surface emitters located in regularly alternating ring patterns. For example, a first radial slices may be scanned using a surface coupler disposed on the perimeter of a first ring, and a second radial slice, adjacent to the first radial slice, may be scanned using a surface coupler disposed on the perimeter of a second, different ring.

Embodiments of the present invention can be implemented using all optical switching technology, for example including micro-electromechanical systems (MEMS) devices, Liquid Crystal on Silicon (LCOS) devices, or Silicon Photonics devices, or a combination thereof. According to embodiments of the present invention the LIDAR may be operated at a variety of sweeping speeds, for example from a frequency below 1 Hz to a frequency on the order of 1, 10 or 100 MHz.

In one embodiment, 4096 surface emitters (surface grating couplers) each having an area of 250 microns by 250 microns can be disposed on a single chip with a 12-stage optical switch fabric. Each of the surface emitters is disposed and configured to emit light in a different direction, through a combination of orientation and, for example in the case of a surface grating coupler, grating period. The resulting LIDAR emitter may have a field of view of 110 degrees by 30 degrees with a resolution of 2 degrees by 0.4 degrees respectively. Each of the surface emitters has a surface area sufficient to emit a beam having a divergence of approximately 0.4 degrees at a wavelength of 905 nm.

In more detail regarding the above and other embodiments, assuming Gaussian beam divergence and an operating wavelength $\lambda_0$, it is known that (for a given refractive index n) the beam waist (cross sectional radius) $\omega_0$ is related to the total angular spread $\Theta$ of the beam far from the waist via:

$$\Theta = \frac{2\lambda_0}{\pi n \omega_0}. \quad (2)$$

The resolution of a beam is considered to be about equivalent to its divergence. To avoid clipping, the size of a surface emitter may be designed to be about $3\omega_0$ in each direction. Thus, on the one hand, a larger surface emitter is required for lower beam divergence and thus higher resolution, while on the other hand, when surface emitters are larger, fewer of them can be packed into a limited space. The above guidelines can be used for design and layout of particular embodiments.

Embodiments of the present invention can be used in a variety of applications such as but not necessarily limited to LIDAR, self-driving vehicles, pattern recognition, face-scanning, surveying, object scanning in manufacturing, object recognition in manufacturing, and optical communication switching equipment.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An optical beamsteering apparatus comprising:
an optical switch fabric comprising a first port and a plurality of second ports and configured to controllably establish an optical path between the first port and a selected one of the plurality of second ports;
a plurality of surface/edge couplers each optically coupled to a different respective one of the plurality of second ports, each of the plurality of surface/edge couplers configured to couple light from or to the apparatus in a different respective direction.

2. The apparatus of claim 1, wherein the apparatus is a LIDAR apparatus.

3. The apparatus of claim 1, further comprising a controller configured to operate the optical switch to establish the optical path.

4. The apparatus of claim 3, further comprising a tunable laser light source operatively coupled to the first port and to the controller, wherein the controller is configured to adjust an operating wavelength of the tunable laser light source.

5. The apparatus of claim 1, wherein the first port is a selected one of a plurality of first ports, each of the plurality of first ports being optically connectable via the optical switch fabric to at least one of the plurality of second ports.

6. The apparatus of claim 5, wherein the optical switch fabric is further configured to controllably establish, either concurrently or at a different time, a second optical path between a second selected one of the plurality of first ports and a second selected one of the plurality of second ports.

7. The apparatus of claim 1, wherein each of the plurality of surface/edge couplers is optically coupled to said different respective one of the plurality of second ports either directly or via an optical waveguide.

8. The apparatus of claim 1, wherein at least one of the surface/edge couplers is an optical grating coupler.

9. The apparatus of claim 1, wherein a first one of the surface/edge couplers is an optical grating coupler having a first grating period and a second one of the surface/edge couplers is an optical grating coupler having a second grating period different from the first grating period.

10. The apparatus of claim 1, wherein at least one of the surface/edge couplers is an optical edge coupler.

11. The apparatus of claim 1, wherein a first one of the surface/edge couplers has a longitudinal axis oriented in a first direction and a second one of the surface/edge couplers has a longitudinal axis oriented in a second direction different from the first direction.

12. The apparatus of claim 11, wherein the first direction and the second direction lie in a plane of the apparatus and form an acute angle.

13. The apparatus of claim 1, wherein at least some of the plurality of second ports are arranged around a perimeter of a circle.

14. The apparatus of claim 1, wherein the plurality of surface/edge couplers are arranged on a planar surface in a ring pattern or in a plurality of concentric ring patterns.

15. The apparatus of claim 1, wherein the plurality of surface/edge couplers are arranged in a rectangular grid pattern.

16. The apparatus of claim 1, wherein the plurality of surface/edge couplers are grating couplers arranged on a planar surface in a plurality of concentric rings, and wherein grating couplers belonging to a first one of the plurality of concentric rings have a first grating period and grating couplers belonging to a second one of the plurality of concentric rings have a second grating period different from the first grating period.

17. The apparatus of claim 1, further comprising a plurality of lenses each optically coupled to a different respective one of the plurality of surface/edge couplers.

18. The apparatus of claim 1, wherein at least one of the plurality of surface/edge couplers is a grating coupler having a length and a width, the length equal to at least 10 times the width.

19. The apparatus of claim 1, wherein at least one of the plurality of surface/edge couplers is a grating coupler comprising a Silicon waveguide and a patterned Silicon Nitride overlay.

20. The apparatus of claim 1, further comprising a plurality of prisms each optically coupled to a different one or a subset of the plurality of surface/edge couplers, the plurality of prisms cooperating with the plurality of surface/edge couplers to cause each of the plurality of surface/edge couplers to couple light from or to the apparatus in a different respective direction.

21. The apparatus of claim 20, wherein some or all of the plurality the surface/edge couplers are identical in design, and the plurality of prisms optically coupled to said some or all of the plurality the surface/edge couplers each have a different prism angle.

22. The apparatus of claim 1, further comprising a diffractive optical element disposed over the plurality of surface/edge couplers and configured to spread light received by each of the plurality of surface/edge couplers into plural light beams.

23. A method for operating an optical beamsteering device, the method comprising:
receiving an indication of a first direction in which to emit light from or receive light to the device at a first time; and
operating an optical switch to route light between a first port of the optical switch and a selected one of a plurality of second ports of the optical switch at the first time, the first port coupled to a light source or a light detector, each of the plurality of second ports coupled to a different respective one of a plurality of surface/edge couplers, each of the plurality of surface/edge couplers configured to couple light from or to the device in a different respective direction;
wherein the selected one of a plurality of second ports is coupled to a respective one of the plurality of surface/edge couplers which is configured to couple light in the first direction.

24. The method of claim 23, further comprising adjusting an operating wavelength of a tunable laser light source.

25. The method of claim 23, wherein each of the plurality of surface/edge couplers is optically coupled to said different respective one of the plurality of second ports either directly or via an optical waveguide.

26. The method of claim 23, wherein a first one of the surface/edge couplers is an optical grating coupler having a first grating period and a second one of the surface/edge couplers is an optical grating coupler having a second grating period different from the first grating period.

27. The method of claim 23, wherein a first one of the surface/edge couplers has a longitudinal axis oriented in a first direction and a second one of the surface/edge couplers has a longitudinal axis oriented in a second direction different from the first direction.

* * * * *